US008376222B1

(12) United States Patent
Billman et al.

(10) Patent No.: US 8,376,222 B1
(45) Date of Patent: Feb. 19, 2013

(54) SYSTEMS AND METHODS TO TEMPORARILY TRANSFER FUNDS TO A MEMBER

(75) Inventors: Bradly Jay Billman, San Antonio, TX (US); Reynaldo Medina, III, San Antonio, TX (US); Benjamin Hunter Stotts, Spring Branch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 915 days.

(21) Appl. No.: 11/929,998

(22) Filed: Oct. 30, 2007

(51) Int. Cl.
*G06K 5/00* (2006.01)

(52) U.S. Cl. ........................ 235/380; 235/382

(58) Field of Classification Search .................. 235/487, 235/488, 380, 436, 379, 384, 382; 705/39, 705/64, 43, 40, 41, 51, 45; 345/204
See application file for complete search history.

(56) References Cited

U.S. PATENT DOCUMENTS

| | | | |
|---|---|---|---|
| 4,926,480 A | 5/1990 | Chaum | |
| 5,577,109 A | 11/1996 | Stimson et al. | |
| 5,585,787 A | 12/1996 | Wallerstein | |
| 5,907,142 A * | 5/1999 | Kelsey | 235/380 |
| 5,907,149 A * | 5/1999 | Marckini | 235/487 |
| 6,394,343 B1 | 5/2002 | Berg et al. | |
| 6,609,114 B1 | 8/2003 | Gressel et al. | |
| 6,886,742 B2 | 5/2005 | Stoutenburg et al. | |
| 7,013,293 B1 * | 3/2006 | Kipnis et al. | 705/43 |
| 7,445,157 B2 | 11/2008 | Clegg et al. | |
| 7,493,269 B2 | 2/2009 | Fostick et al. | |
| 7,734,538 B2 | 6/2010 | Bauerschmidt et al. | |
| 2001/0027994 A1 * | 10/2001 | Hayashida | 235/380 |
| 2002/0123967 A1 * | 9/2002 | Wang | 705/51 |
| 2002/0167500 A1 * | 11/2002 | Gelbman | 345/204 |
| 2003/0028481 A1 * | 2/2003 | Flitcroft et al. | 705/39 |
| 2003/0154163 A1 * | 8/2003 | Phillips et al. | 705/39 |
| 2004/0124246 A1 * | 7/2004 | Allen et al. | 235/380 |
| 2005/0098624 A1 * | 5/2005 | Foss, Jr. | 235/380 |
| 2005/0165695 A1 | 7/2005 | Berardi et al. | |
| 2005/0242193 A1 * | 11/2005 | Smith et al. | 235/487 |
| 2005/0269401 A1 * | 12/2005 | Spitzer et al. | 235/380 |
| 2006/0091149 A1 | 5/2006 | Chen | |
| 2006/0157553 A1 * | 7/2006 | Kelley et al. | 235/380 |
| 2006/0167756 A1 | 7/2006 | VonBergen et al. | |
| 2007/0057052 A1 * | 3/2007 | Goldstein et al. | 235/436 |
| 2007/0198432 A1 * | 8/2007 | Pitroda et al. | 705/64 |
| 2007/0262139 A1 * | 11/2007 | Fiebiger et al. | 235/380 |

(Continued)

OTHER PUBLICATIONS

"American Express Classic Gift Cards", [online]. American Express. 2007 [retrieved on Oct. 19, 2007] Retrieved from the Internet: <URL: http://www10.americanexpress.com/sif/cda/page/0,1641,16130,00.asp>, 2 p.

(Continued)

*Primary Examiner* — Thien T Mai

(74) *Attorney, Agent, or Firm* — Brooks, Cameron & Huebsch, PLLC

(57) ABSTRACT

Systems, methods, and computer-readable media provide a time-limited monetary value to a member of an organization, using a member card or member icon, which may be issued by other than a bank or brokerage institution. In embodiments, the monetary value may be restricted to a single transaction and a maximum amount. In other embodiments, purchases of authorized goods and services may be controlled by corresponding product codes. A password or biometric may be used to authenticate the intended purchaser to the organization and/or merchant.

21 Claims, 25 Drawing Sheets

U.S. PATENT DOCUMENTS

2008/0173708 A1      7/2008    Bonalle et al.
2008/0301019 A1    12/2008    Monk

OTHER PUBLICATIONS

"Stored Value Card: Eliminate Checks, Simplify Processing, and Gain Greater Control Over Company Funds", [online]. La Salle Bank Corporation, 2005 [retrieved on Oct. 2, 2007]. Retrieved from the Internet: <URL: www.lasallebanks.com/commercial/pdfs/Stored_ValueCards.pdf>, 2 p.

"Visa Gift Card: How It Works", [online]. Visa U.S.A. Inc. 2007 [retrieved Oct. 19, 2007] Retrieved from the Internet: <URL: http://usa.visa.com/personal/cards/prepaid/gift_card_how.html>, 2 p.

"Visa Gift Cards", [online]. Visa U.S.A., Inc. 2007 [retrieved Oct. 19, 2007]. Retrieved from the Internet: <URL: http://usa.visa.com/personal/cards/prepaid/visa_gift_card.html>,1 p.

"Welcome to GiftCards.com", [online]. GiftCards.com. 2007 [retrieved Oct. 18, 2007]. Retrieved from the Internet: <URL: www.giftcards.com>, 1 p.

http://web.archive.org/web/20061127233548/www.epromos.com/browse/Ne1-N11038.html.

\* cited by examiner

800

801

ISSUE ICON TO MEMBER OF ORGANIZATION

- PROVIDE ON THE ICON AN ELECTRONIC IDENTIFICATION ASSOCIATED WITH THE MEMBER

- AN ELECTRONIC STORAGE MAY BE PROVIDED ON THE ICON TO STORE A SINGLE CURRENCY VALUE FOR A SINGLE PURCHASE BY THE MEMBER

- A TIME MAY BE STORED IN THE ELECTRONIC STORAGE FOLLOWING WHICH THE CURRENCY VALUE CANNOT BE SPENT

- THE PURCHASE MAY BE FOR ONE OR MORE ITEMS OR SERVICES, THE EXPENDITURE FOR WHICH THE MEMBER IS INSURED, SUCH AS EXPENSES ASSOCIATE WITH VEHICULAR INSURANCE, INCLUDING PURCHASE OF A VEHICLE, VEHICULAR TOWING, VEHICULAR REPAIR, AND MEDICAL EXPENSES

- THE PURCHASE MAY BE FOR PROPERTY AND CASUALTY EXPENSES THAT MAY HAVE BEEN APPROVED FOR THE MEMBER

- AN ELECTRONIC CIRCUIT MAY BE PROVIDED ON THE ICON TO INHIBIT ANY TRANSACTION ATTEMPTED AFTER A SINGLE TRANSACTION

- INDICIA MAY BE PROVIDED ON THE ICON TO IDENTIFY THE ISSUING ORGANIZATION

- THE ICON MAY HAVE FORM OR SHAPE, E.G. A VEHICLE

- THE ICON MAY BE THE MEMBER'S OWN HANDHELD DEVICE, SUCH AS A CELL PHONE, PDA, ETC.

- THE ICON MAY COMPRISE AN EMBEDDED ELECTRONIC DEVICE OR CIRCUIT, SUCH AS AN RFID TAG

ISSUE CARD TO MEMBER OF INSURANCE ORGANIZATION

- PROVIDE ON THE CARD AN ELECTRONIC IDENTIFICATION ASSOCIATED WITH THE MEMBER

- AN ELECTRONIC STORAGE MAY BE PROVIDED ON THE CARD TO STORE A SINGLE CURRENCY VALUE FOR A SINGLE PURCHASE BY THE MEMBER

- A TIME MAY BE STORED IN THE ELECTRONIC STORAGE FOLLOWING WHICH THE CURRENCY VALUE CANNOT BE SPENT

- THE SINGLE PURCHASE MAY BE WITHIN AN AUTHORIZED CATEGORY OF PURCHASES, SUBJECT TO ANY APPLICABLE DEDUCTIBLE

- THE SPECIFIC PURCHASE HAS NOT NECESSARILY BEEN AUTHORIZED BY THE ORGANIZATION

- A LIST OF PRODUCT CODES MAY BE STORED IN THE ELECTRONIC STORAGE CORRESPONDING TO THE AUTHORIZED CATEGORY OF PURCHASES

- A LOGIC CIRCUIT MAY BE PROVIDED ON THE CARD TO INHIBIT ANY TRANSACTION ATTEMPTED AFTER A SINGLE TRANSACTION

- THE LOGIC CIRCUIT MAY INHIBIT ANY TRANSACTION OTHER THAN FOR THE AUTHORIZED CATEGORY OF PURCHASES

- THE LOGIC CIRCUIT MAY INHIBIT ANY ATTEMPT TO SPEND MORE THAN THE SINGLE CURRENCY VALUE

*FIG. 9A*

SYSTEMS AND METHODS TO TEMPORARILY TRANSFER FUNDS TO A MEMBER

RELATED APPLICATIONS

The present application is also related to the following applications that were assigned to the same assignee as the present application and were filed on even date herewith:

U.S. Ser. No. 11/930,007, entitled Systems and Methods to Temporarily Transfer Funds to a Member; and U.S. Ser. No. 11/930,022, entitled Systems and Methods to Temporarily Transfer Funds to a Member; and U.S. Ser. No. 11/930,030, entitled Systems and Methods to Temporarily Transfer Funds to a Member; and U.S. Ser. No. 11/930,042, entitled Systems and Methods to Temporarily Transfer Funds to a Member.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice shall apply to this document: Copyright © 2007, USAA.

BACKGROUND

Currently, organizations, associations, and institutions, other than banks and other financial institutions, may need to transfer funds to one of their customers or members. For example, an insurance company may need to settle an automotive repair or replacement claim by sending a check to a member for the cost of covered repairs or to buy a replacement vehicle. In general, such payments or checks are sent by U.S. Postal Service or by an overnight delivery service. This is relatively slow, requiring from at least one day up to several days in transit, and as a result the member may be significantly inconvenienced while waiting for the funds to arrive to make the needed repairs or buy the replacement vehicle.

Thus, systems and methods are needed that address the shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods to make funds available to a member are provided. Various embodiments, including systems, methods, and computer-readable media, to speed the delivery of purchase funds to a member are described. In some embodiments, the funds may be restricted to a single transaction and for a specific or maximum amount, while in other embodiments a plurality of purchases may be made up to the maximum amount. In other embodiments, purchases of authorized goods and services may be controlled by corresponding product codes. The purchases may be time-restricted. Optionally, a password or biometric may be used to authenticate the intended purchaser to the organization and/or to the merchant.

Below is a description of other advantages and features of the inventive subject matter.

BRIEF DESCRIPTION OF THE DRAWINGS

Systems and methods to temporarily transfer funds to a member are further described with reference to the accompanying drawings in which:

FIGS. 8A-8C together constitute a flow diagram illustrating several methods according to various embodiments.

FIGS. 9A-9D together constitute a flow diagram illustrating several methods according to various embodiments.

DETAILED DESCRIPTION

Certain specific details are set forth in the following description and figures to provide a thorough understanding of various embodiments of the inventive subject matter. Certain well-known details often associated with computing and software technology are not set forth in the following disclosure to avoid unnecessarily obscuring the various embodiments of the inventive subject matter. Further, those of ordinary skill in the relevant art will understand that they can practice other embodiments of the inventive subject matter without one or more of the details described below. Finally, while various methods are described with reference to operations and sequences in the following disclosure, the description as such is for providing a clear implementation of embodiments of the inventive subject matter, and the operations and sequences of operations should not be taken as required to practice this inventive subject matter.

Example Computing Devices

Figure 1:
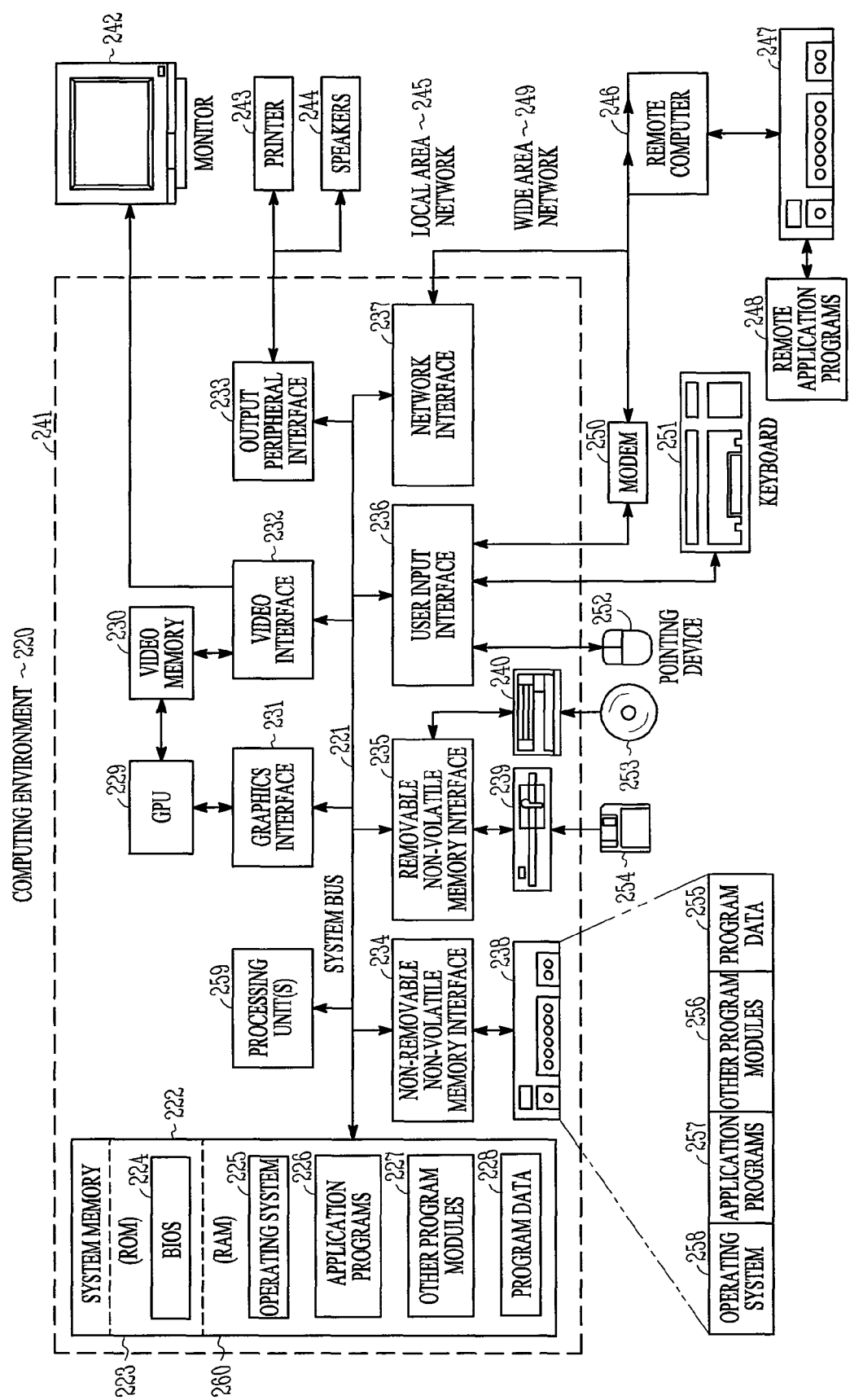
FIG. 1 is a block diagram representing an exemplary computing device suitable for use in conjunction with providing a time-limited transfer of purchase funds to a member.

Referring to FIG. 1, shown is a block diagram representing an exemplary computing device suitable for use in conjunction with implementing the processes described above. For example, the computer-executable instructions that carry out the processes and methods for a document ordering, retrieving, and delivery system may reside and/or be executed in such a computing environment as shown in FIG. 1. The computing system environment 220 is only one example of a suitable computing environment and is not intended to suggest any limitation as to the scope of use or functionality of the inventive subject matter. Neither should the computing environment 220 be interpreted as having any dependency or requirement relating to any one or combination of components illustrated in the exemplary operating environment 220.

Aspects of the inventive subject matter are operational with numerous other general purpose or special purpose computing system environments or configurations. Examples of well known computing systems, environments, and/or configurations that may be suitable for use with the inventive subject matter include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the inventive subject matter may be implemented in the general context of computer-executable instructions, such as program modules, being executed by a computer. Generally, program modules include routines, programs, objects, components, data structures, etc. that perform particular tasks or implement particular abstract data types. Aspects of the inventive subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the inventive subject matter includes a general purpose computing device in the form of a computer 241. Components and/or subsystems or modules of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, the Peripheral Component Interconnect (PCI) bus also known as Mezzanine bus, as well as its successor, the PCI-Express standard.

Computer 241 typically includes a variety of computer-readable media. Computer-readable media can be any available media that can be accessed by computer 241 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage, or other magnetic storage devices, or any other medium that can be used to store the desired information and that can be accessed by computer 241. Communication media typically embodies computer-readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

The system memory 222 includes computer storage media in the form of volatile and/or nonvolatile memory such as read-only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer-readable instructions, data structures, program modules, and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball, or touch pad. Other input devices (not shown) may include a microphone, joystick, game pad, satellite dish, scanner, or the like. These and other input devices are often connected to the processing unit 259 through a user input interface 236 that is coupled to the system bus, but they may be connected by other interface and bus structures, such as a parallel port, game port, or a universal serial bus (USB). A monitor 242 or other type of display device is also connected to the system bus 221 via an interface, such as an insecure or secure video interface 232.

An exemplary secure video standard would be the High-Definition Multimedia Interface (HDMI) standard. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device, or other common network node, and it typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but they may also include other networks. Such networking environments are commonplace in offices, enterprise-wide computer networks, intranets, and the Internet.

When used in a LAN networking environment, the computer 241 is connected to the LAN 245 through a network interface or adapter 237. When used in a WAN networking environment, the computer 241 typically includes a modem 250 or other element for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other element of establishing a communications link between the computers may be used.

It should be understood that the various techniques described herein may be implemented in connection with hardware or software or, where appropriate, with a combination of both. Thus, the methods and apparatus of the inventive subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the inventive subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the inventive subject matter, e.g., through the use of an API, reusable controls, or the like. Such programs are preferably implemented in a high-level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the inventive subject matter in the context of one or more stand-alone computer systems, the inventive subject matter is not so limited, but rather it may be implemented in connection with any computing environment, such as a network or distributed computing environment. Still further, aspects of the inventive subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the inventive subject matter should not be limited to any single embodiment, but rather it should be construed in breadth and scope in accordance with the appended claims.

Figure 2:
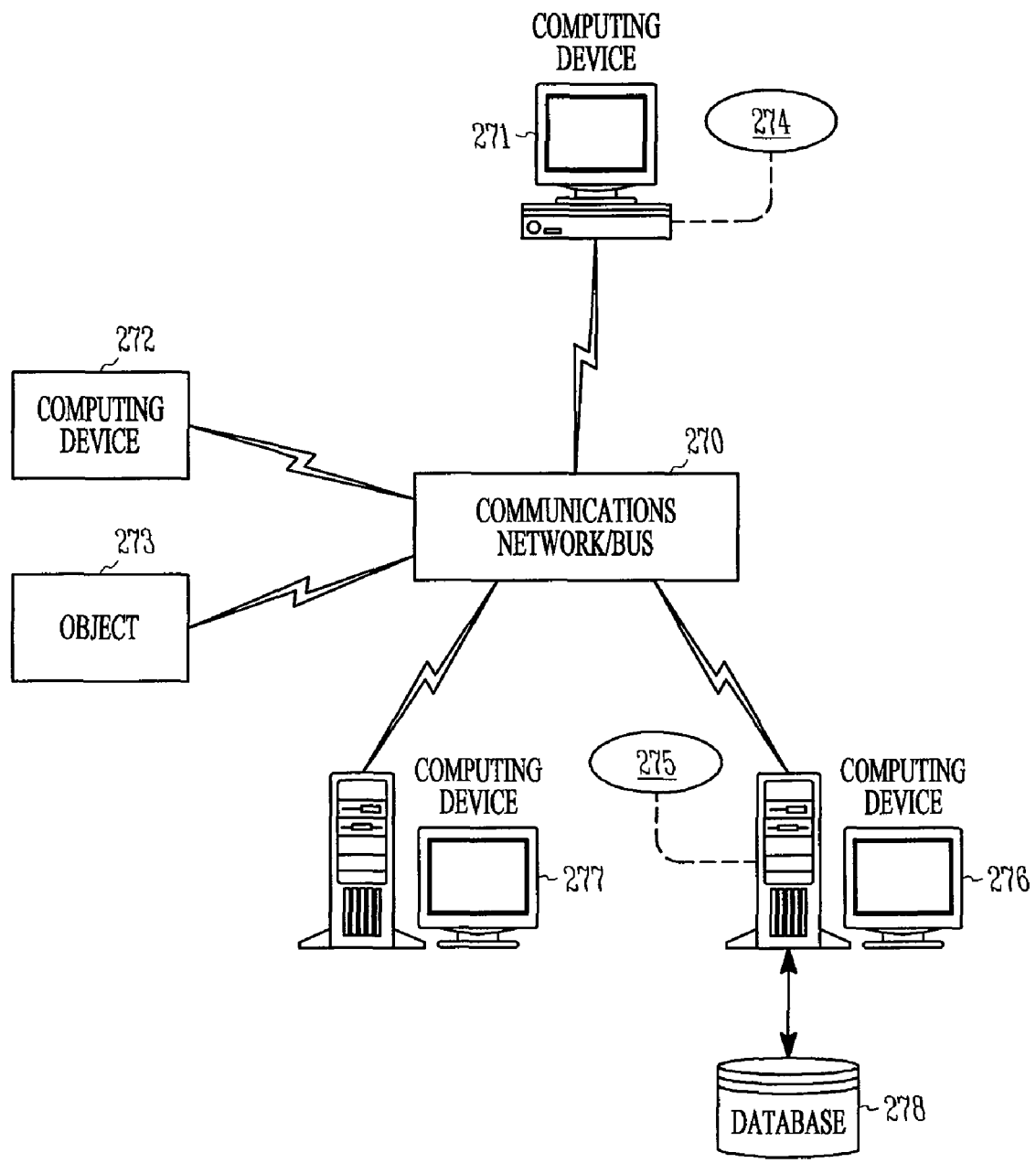
FIG. 2 illustrates an exemplary networked computing environment in which many computerized processes may be implemented to provide a time-limited transfer of purchase funds to a member.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing a document ordering, retrieving, and delivery system. One of ordinary skill in the art can appreciate that networks can connect any computer or other client or server device, or other devices in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects, or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277, and 278 may comprise or make use of programs, methods, data stores, programmable logic, etc. The entities 271, 272, 273, 274, 275, 276, 277, and 278 may span portions of the same or different devices such as PDAs, audio/video devices, MP3 players, personal computers, etc. Each entity 271, 272, 273, 274, 275, 276, 277, and 278 can communicate with another entity 271, 272, 273, 274, 275, 276, 277, and 278 by way of the communications network 270. In this regard, any entity may be responsible for the maintenance and updating of a database 278 or other storage element.

This network 270 may itself comprise other computing entities that provide services to the system of FIG. 2, and it may itself represent multiple interconnected networks. In accordance with an aspect of the inventive subject matter, each entity 271, 272, 273, 274, 275, 276, 277, and 278 may contain discrete functional program modules that might make use of an API, or other object, software, firmware, and/or hardware, to request services of one or more of the other entities 271, 272, 273, 274, 275, 276, 277, and 278.

It can also be appreciated that an object, such as 275, may be hosted on another computing device 276. Thus, although the physical environment depicted may show the connected devices as computers, such illustration is merely exemplary, and the physical environment may alternatively be depicted or described comprising various digital devices such as PDAs, televisions, MP3 players, etc., software objects such as interfaces, COM objects, and the like.

There are a variety of systems, components, and network configurations that support distributed computing environments. For example, computing systems may be connected together by wired or wireless systems, by local networks, or by widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277, and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) may communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the inventive subject matter should not be limited to any single embodiment, but rather it should be construed in breadth and scope in accordance with the appended claims.

Figure 3:
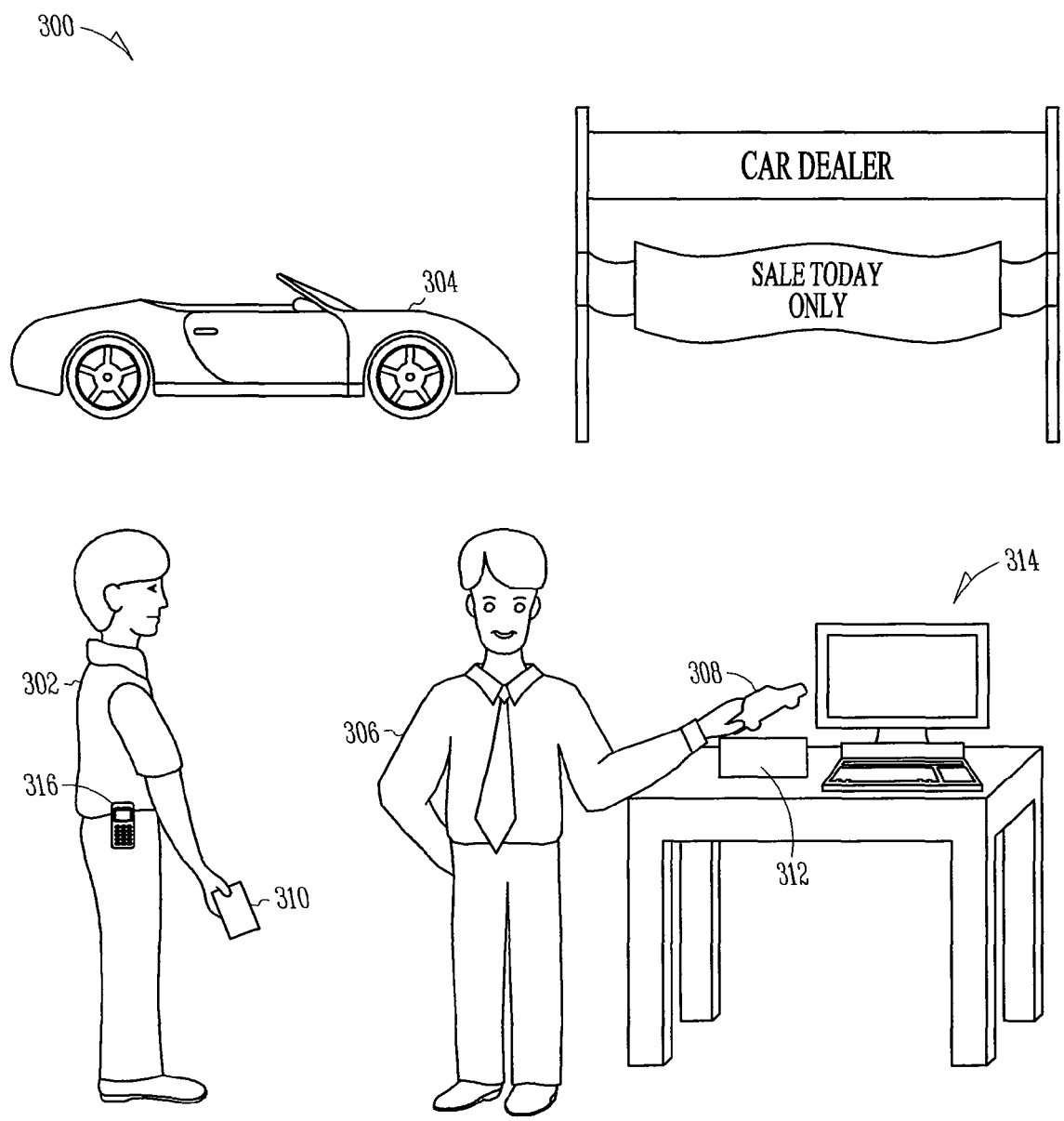
FIG. 3 is a perspective depiction of systems, devices, and methods of temporarily transferring purchase funds to a member of an institution according to various embodiments.

FIG. 3 is a perspective depiction of systems, devices, and methods of temporarily transferring purchase funds to a member of an institution according to various embodiments. As shown in this scenario 300, a member 302 is at a car dealer to purchase a replacement vehicle 304 for one that was damaged or destroyed and for which a replacement purchase has been authorized by the institution. The member 302 has found a car 304 and has negotiated a satisfactory sales package for a purchase price that is acceptable to the institution. The member 302 has confirmed with the institution via phone 316 that it will pay for car 304 at the negotiated purchase price. The dealer's sale is for "today only", so the member 302 cannot wait for a check to be sent in the amount of the purchase price from the institution, because even if it were sent by overnight delivery, it would be received too late for member 302 to buy the car 304 at the sale price.

Fortunately, the member 302 has a faster method of purchase available to him. As shown, the member 302 has handed the car salesman 306 a payment icon 308, which the salesman 306 is waving or swiping over a point-of-sale (POS) reader 312, which may be coupled to a computer system 314. As will be explained in greater detail below, the payment icon 308, which may be in the shape of a car or any other shape, contains a unique identifying number associated with member 302.

In an alternative embodiment, the member 302 is shown holding a payment card 310, which may function in the same general manner as payment icon 308, or in a different manner.

In a minimum implementation, payment card 310 or payment icon 308 contains an electronic identification (ID) (digital or analog) associated with member 302, and a mechanism to enable the POS reader 312 to read it. As will be seen from the description of FIG. 5 below, the mechanism may be a Radio Frequency Identification (RFID) tag, or suitable alternative, including those further discussed below. When the payment icon 308 (or payment card 310) is waved over the POS reader 312, the electronic ID is read and conveyed back to the institution's transaction server, which clears the transaction for the authorized payment amount, which has previously been stored in an associated database.

Additional features may be provided, such as authentication of the member 302, and the optional display of the payment amount directly by the payment icon 308 and/or payment card 310. In addition, provision may be made to transfer a currency value from the payment icon 308 or payment card 310 of one member to that of another member.

Various implementations and other features of the systems, methods, and devices of the inventive subject matter will be discussed in detail below.

Figure 4:
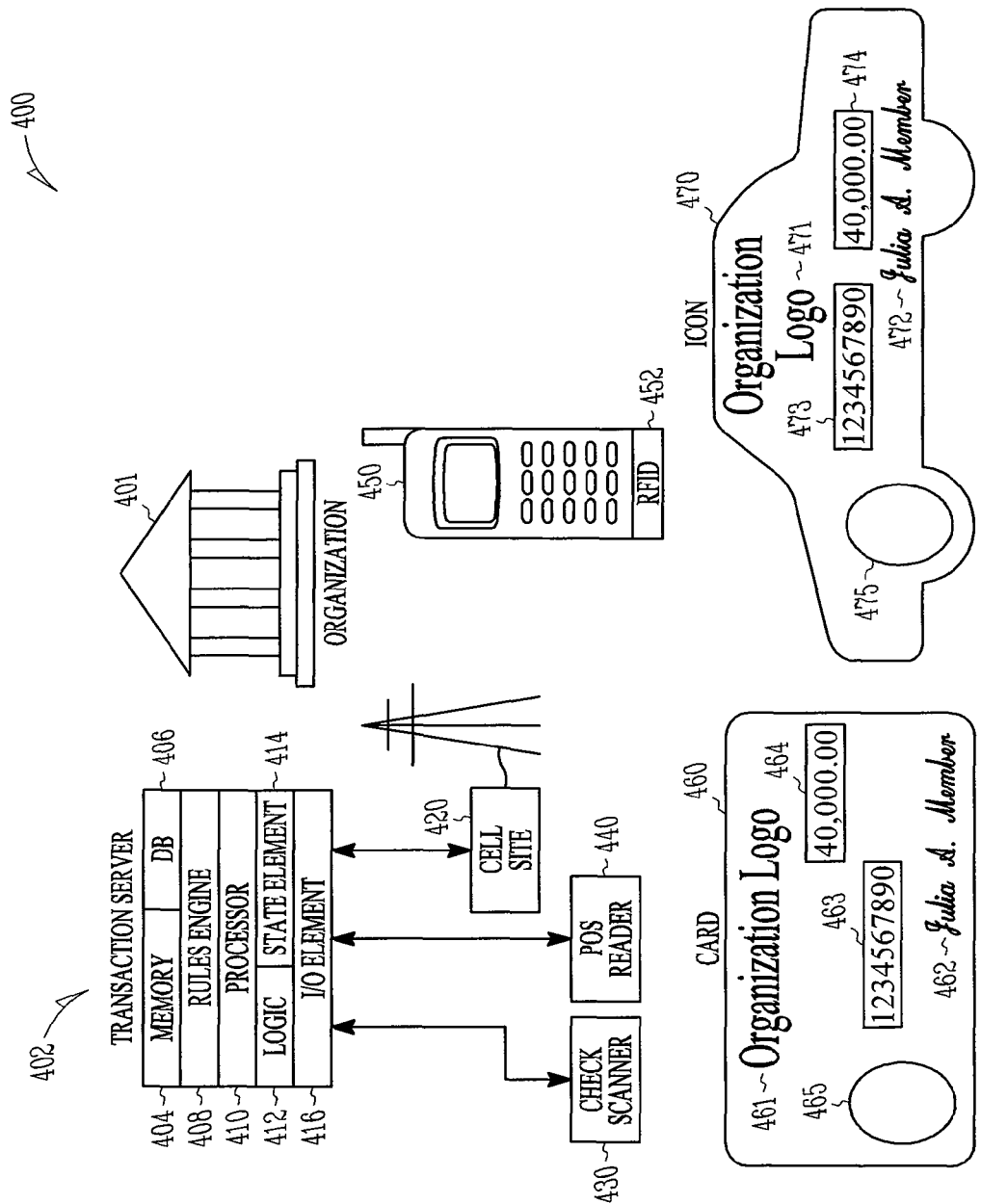
FIG. 4 is a schematic representation of systems, devices, and methods of temporarily transferring purchase funds to a member according to various embodiments.

FIG. 4 is a schematic representation of systems, devices, and methods of temporarily transferring purchase funds to a member according to various embodiments. A member payment system, shown generally as 400, may comprise a transaction server 402, which may be co-located with the member's organization, association, or institution 401.

In embodiments, the organization 401 is not a bank, brokerage house, or other financial institution dealing primarily with cash or investment accounts. In some embodiments, for example, the organization 401 may be an insurance company, automobile association, travel association, educational institution, military institution, or other membership organization.

Transaction server 402, in an embodiment, comprises a memory 404, a database 406, a rules engine 408, a processor 410, logic 412, at least one state element 414, and an input/output (I/O) element or subsystem 416. Rules engine 408, processor 410, logic 412, and state element 414 may, in some embodiments, be one and the same, or in other embodiments, they may be different software and/or hardware entities, in any desired combination.

A cellular telephone base station or cell site 420 is shown communicatively coupled to the I/O element 416 of transaction server 402. Other communication infrastructure (not illustrated), such as telephone land lines, computer network cables, satellite communication systems, and the like may also be coupled to transaction server 402 to enable communication with transaction server 402.

In some embodiments, a check scanner 430 is optionally used by a member to scan the currency value of a check, written to the member as payee, into the member's payment card or icon.

In some embodiments, a point-of-sale (POS) reader 440 may be used to read information from the member's payment card or icon.

In some embodiments, a personal electronic device 450, such as a cell phone, PDA, pager, etc. may be used to perform the function of a member's payment card. For example, an RFID tag 452 or similar identifying device may be incorporated into or affixed to the personal electronic device 450. In a minimal embodiment, the personal electronic device 450 may store a number associated with the member, and it may contain no additional elements to implement the inventive functions described herein.

At the bottom of FIG. 4 are illustrated examples of exemplary embodiments of a member's payment card 460 and a member's payment icon 470. A member may have one or the other or both.

The payment card 460 may have any desired shape or appearance. In an embodiment, payment card 460 may comprise indicia representing an organization name or organization logo 461, indicia representing a member's name 462, indicia representing a member's membership number 463, an electronic display 464, and a biometric input area 465. The biometric input area 465 may be a thumbprint reader, for example.

The payment icon 470 may have any desired shape or appearance. For a business dealing with automobiles, an auto-shaped form may be appropriate. Payment icon 470 may have identical, similar, or different internal structures and corresponding functions, compared with those of payment card 460. In an embodiment, payment icon 470 may comprise indicia representing an organization name or organization logo 471, indicia representing a member's name 472, indicia representing a member's membership number 473, an electronic display 474, and a biometric input area 475. The biometric input area 475 may be a thumbprint reader, for example.

The components illustrated within a payment card 460 or payment icon 470 are merely representative, and they may be used in any desired combination, with fewer or more components as may be desirable to implement the inventive subject matter. Some or all of the components may be integrated into a fewer number of functional structures or split into additional functional structures. Some of the components may not be provided, depending upon the design specifications of the systems, methods, and card devices.

For example, in a minimal embodiment, a payment card 460 or payment icon 470 may comprise only a number associated with a member. The number may be stored in any suitable way.

Figure 5:
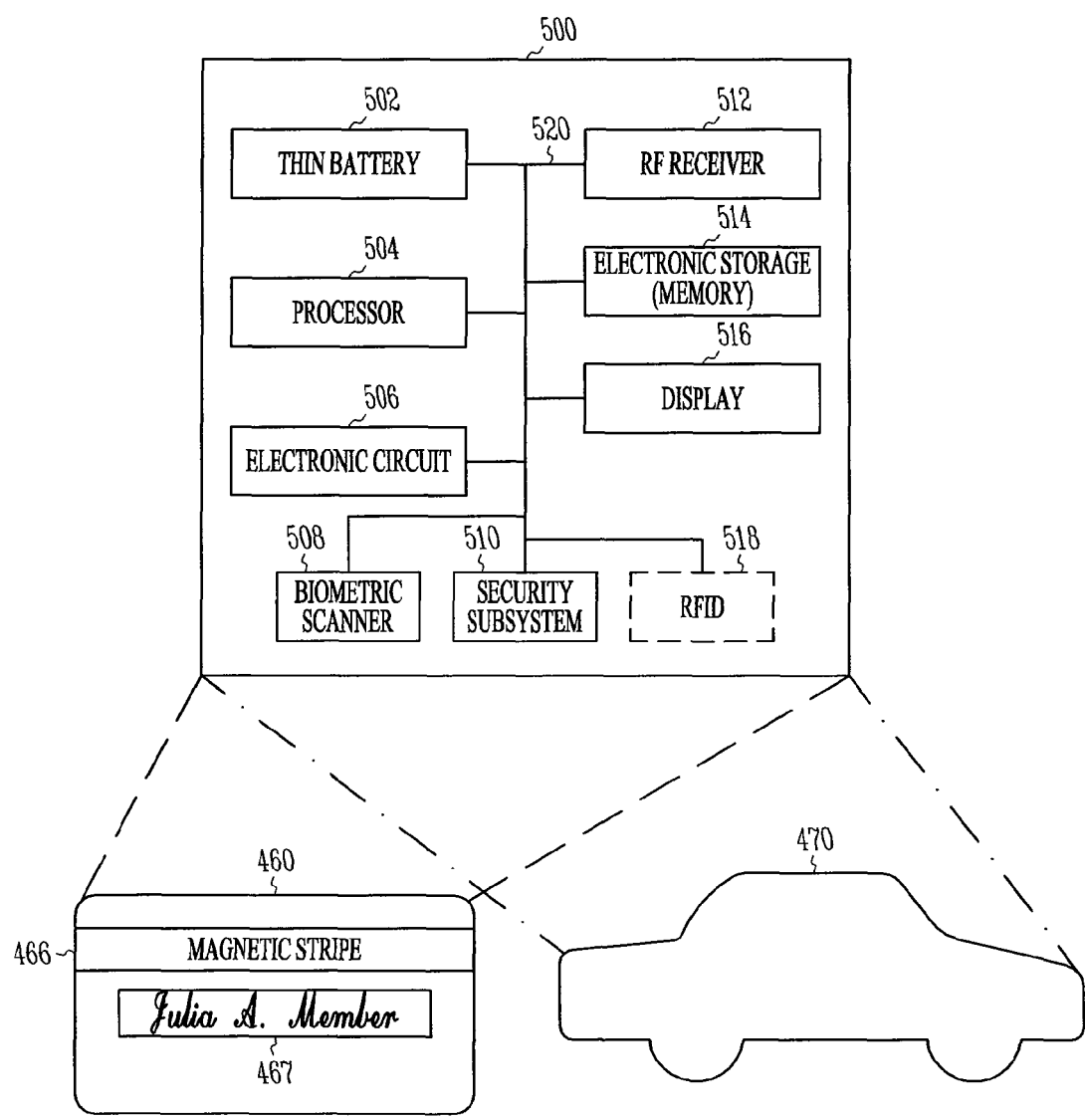
FIG. 5 illustrates various high-level components within a member card or a member icon according to various embodiments.

FIG. 5 illustrates various high-level components within a member card or a member icon according to various embodiments. In the upper portion of FIG. 5 is a block diagram 500 illustrating representative electronic components within a member card or icon. The components may include a thin battery 502 with associated photovoltaic cell for charging purposes (optional and not illustrated), a processor 504, an electronic circuit 506, a biometric scanner 508, a security subsystem 510, a radio-frequency (RF) transceiver 512, an electronic storage 514 (memory), an electronic display 516, and an RFID tag 518. The components illustrated are merely representative, and they may be used in any desired combination, with fewer or more components as may be desirable to implement the inventive subject matter. Some or all of the components may be integrated into a fewer number of functional structures or split into additional functional structures. Some of the components may not be provided, depending upon the design specifications of the systems, methods, and card devices.

For example, in some embodiments, payment card 460 or payment icon 470 may comprise only a member number associated with a member and/or a member's account. The member number could be stored in a magnetic stripe, RFID, optical character recognition (OCR) code, printed indicia, or any other suitable manner.

For example, in some embodiments, the biometric scanner 508 may be used on the payment card 460 but not on the payment icon 470, or vice versa. As another example, the RFID 518 may be provided on payment icon 470 but not on payment card 460, particularly if the latter comprises a magnetic stripe 466, as shown on the representation of payment card 460. As another example, the RF transceiver 512, display 516, and security subsystem 510 may optionally be excluded.

In the lower portion of FIG. 5 is shown a representation of the reverse side of a member's payment card 460 and a reverse side of a member's payment icon 470. Payment card 460 may include a magnetic stripe 466 and a member signature area 467. Magnetic stripe 466 may serve as an interface between the components shown in block 500 and a POS reader (440, FIG. 4), for example.

Some embodiments may include a number of methods. Thus, various exemplary ways of implementing the inventive subject matter will now be discussed in detail below, with reference to the flow diagrams of FIGS. 6-10.

Figure 6A:
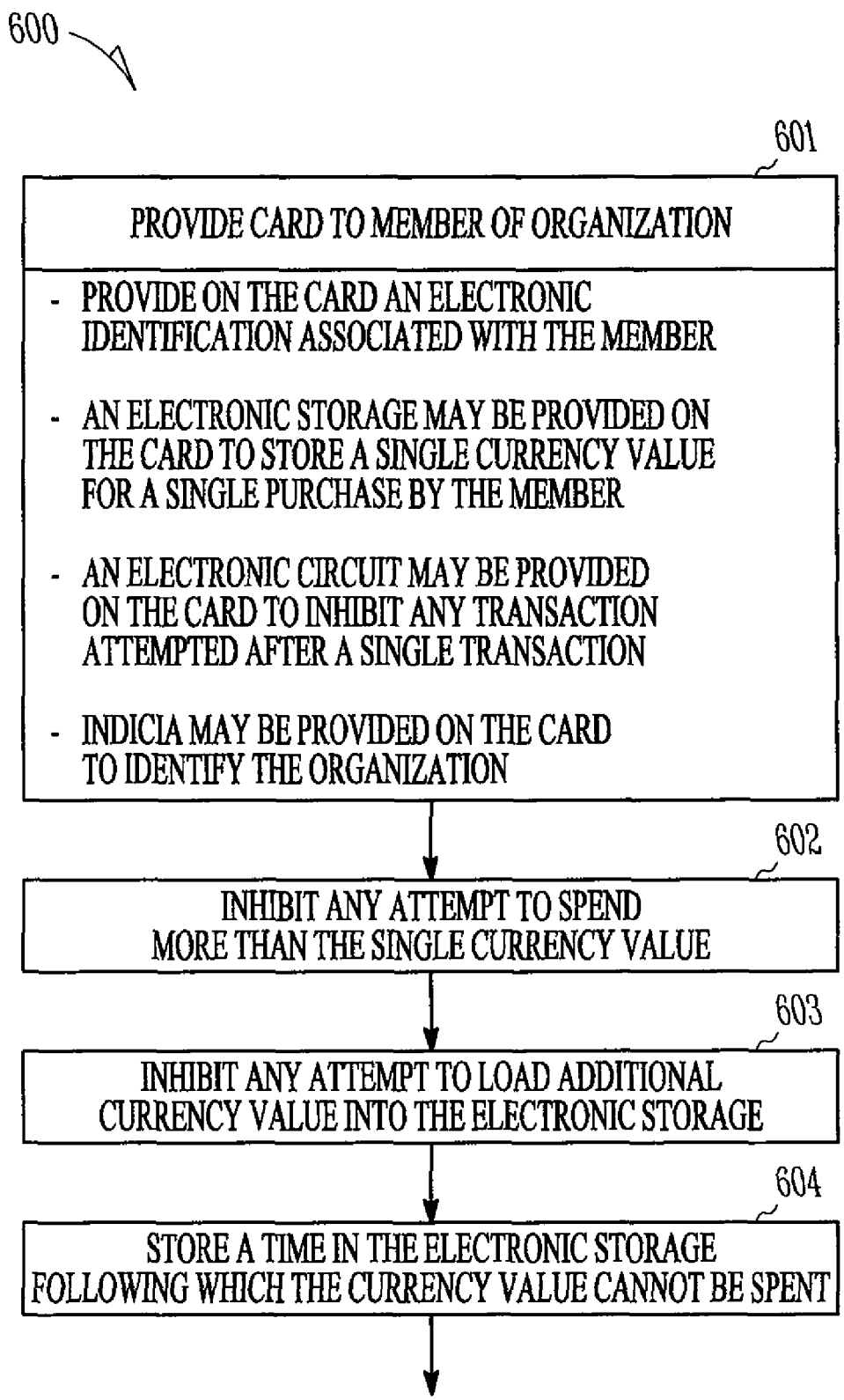
FIGS. 6A and 6B together constitute a flow diagram illustrating several methods according to various embodiments.
Figure 6B:
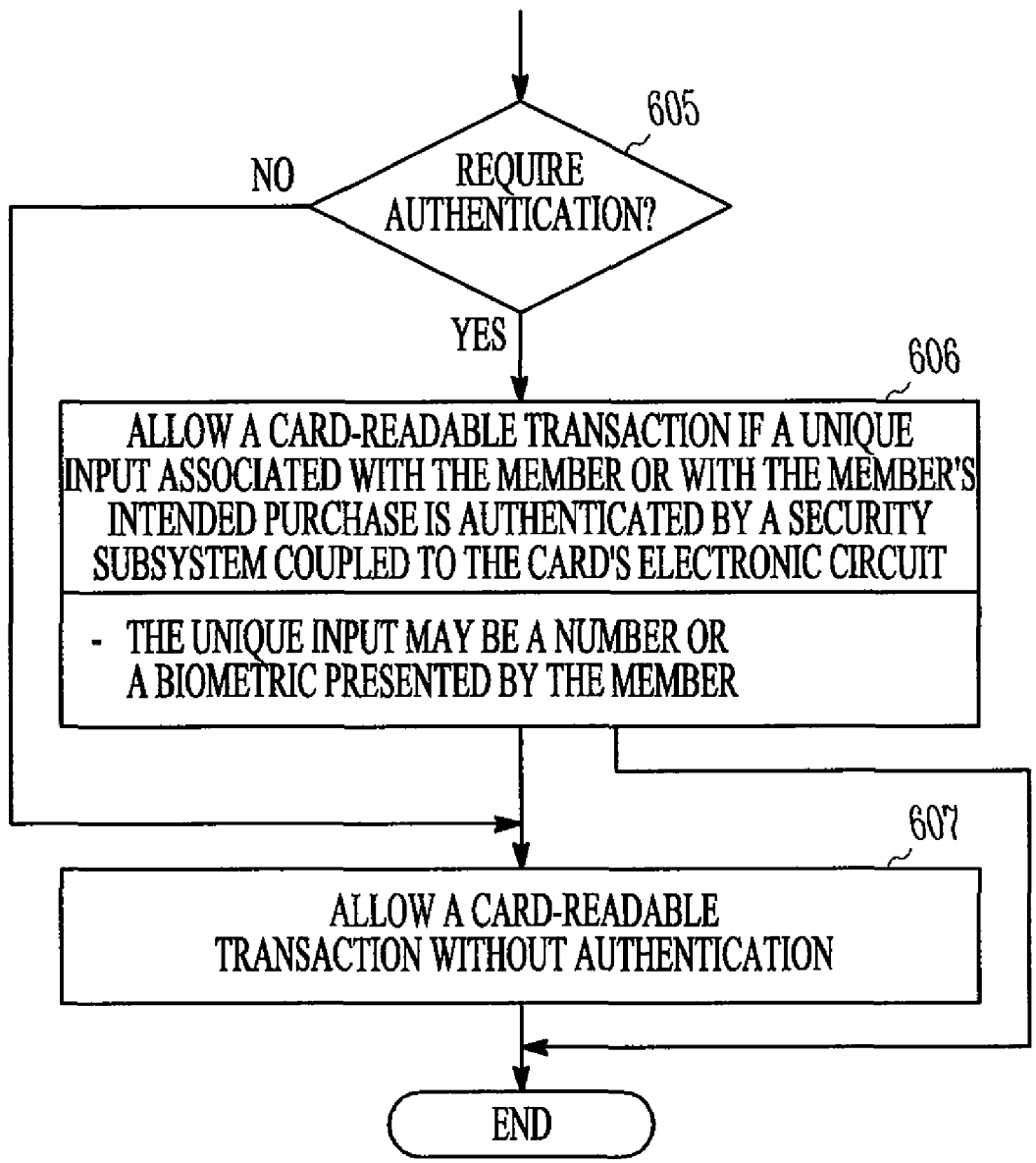
Figure 7A:
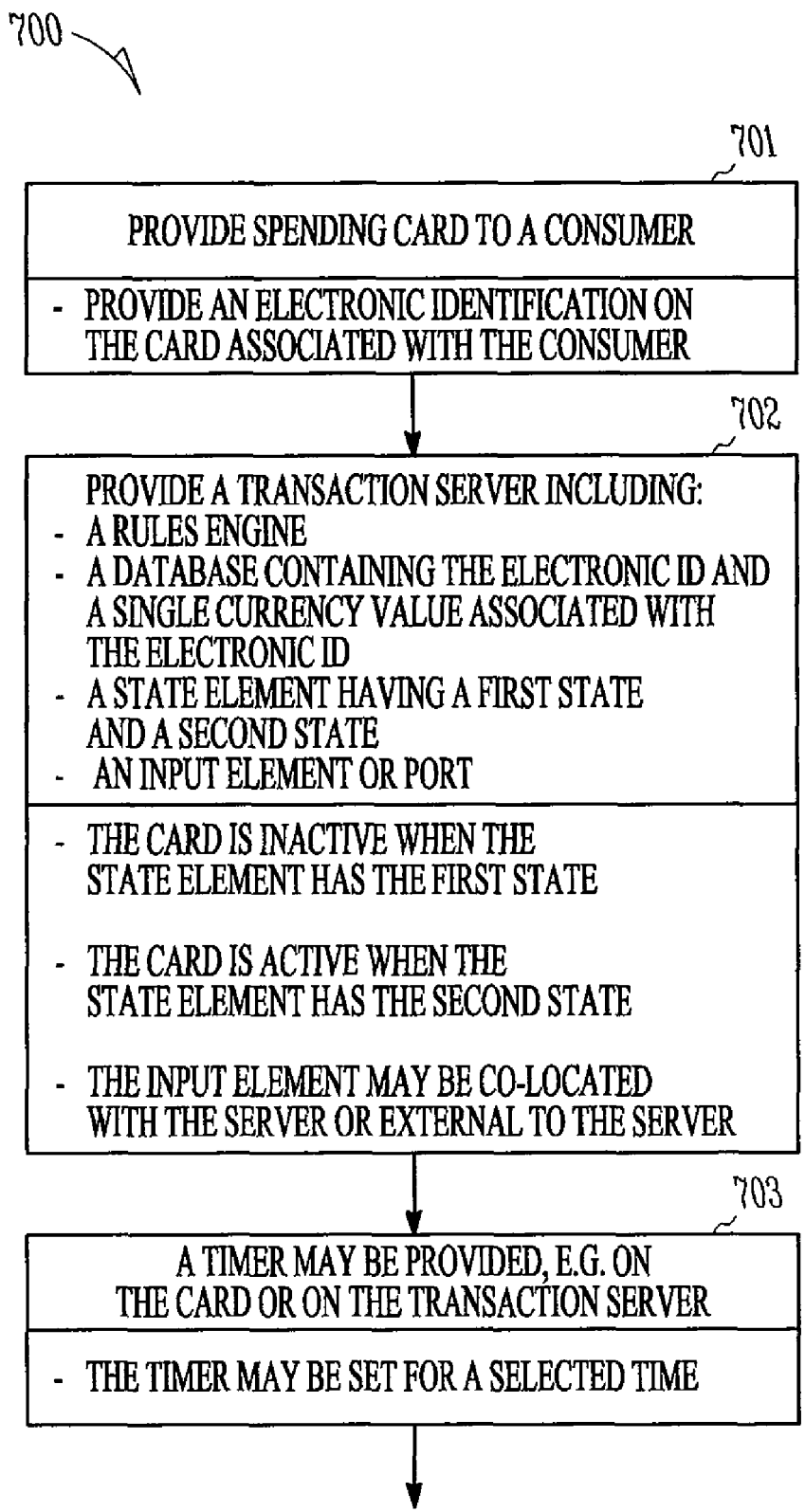
FIGS. 7A-7E together constitute a flow diagram illustrating several methods according to various embodiments.
Figure 7B:
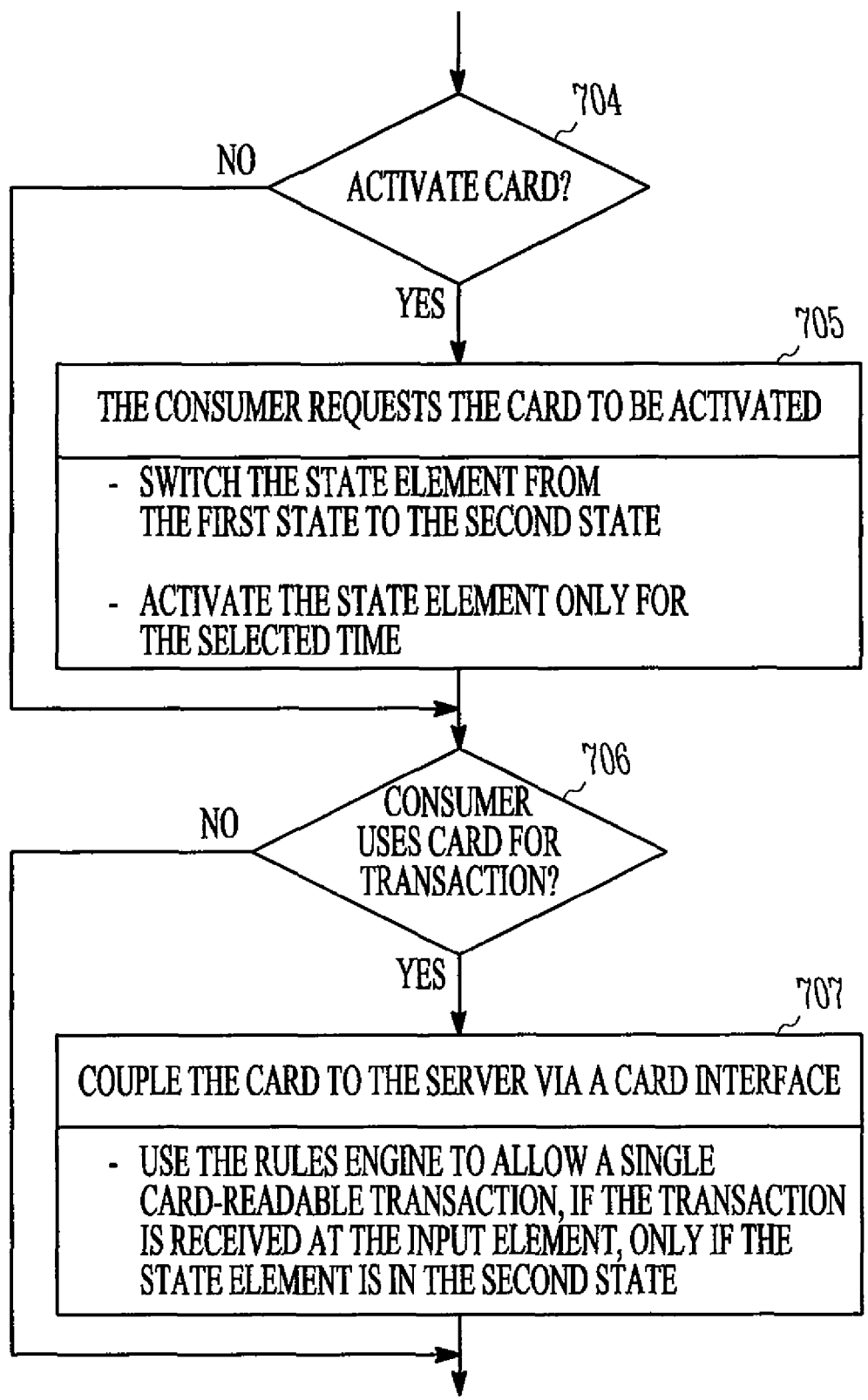
Figure 7C:
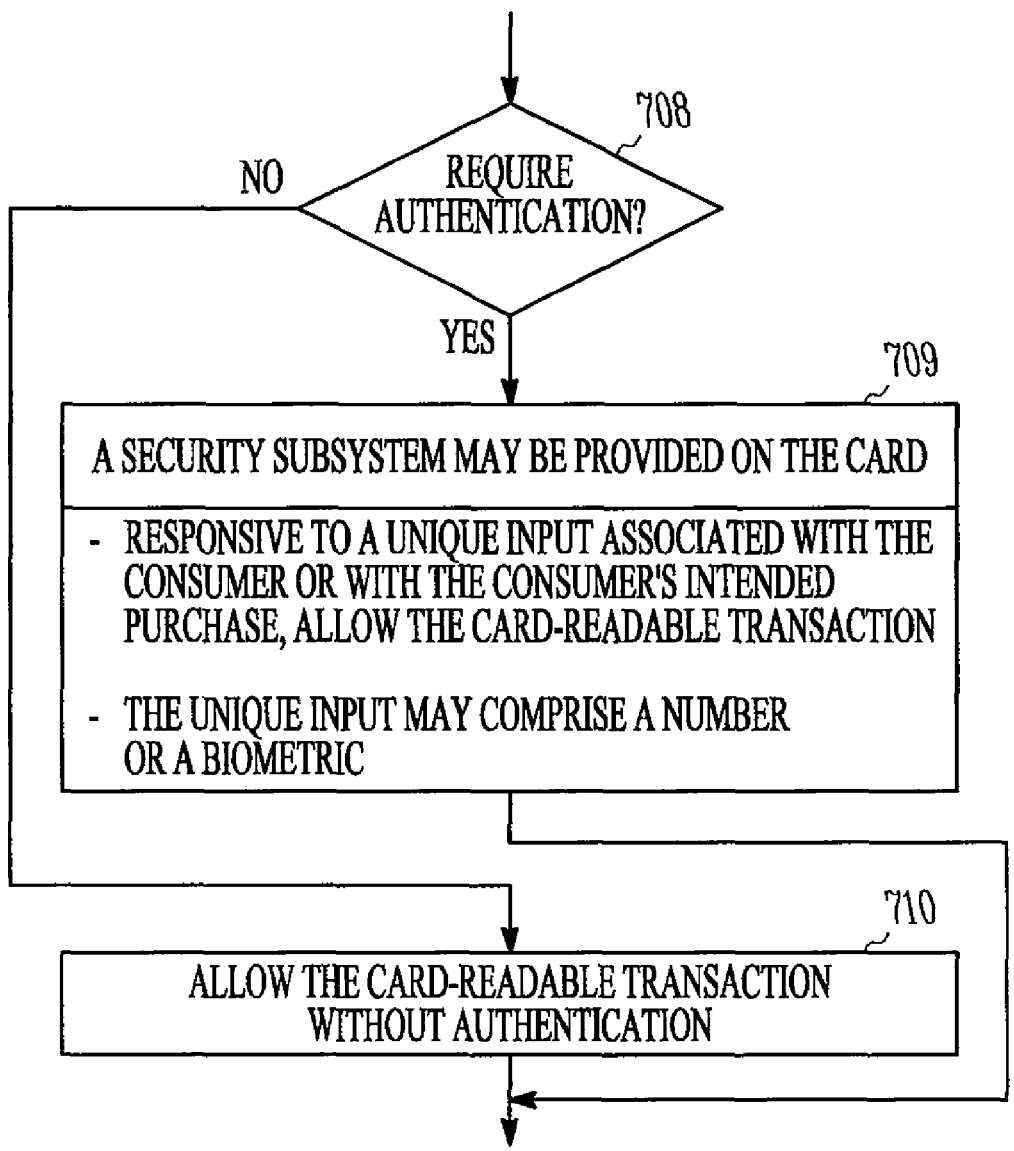
Figure 7D:
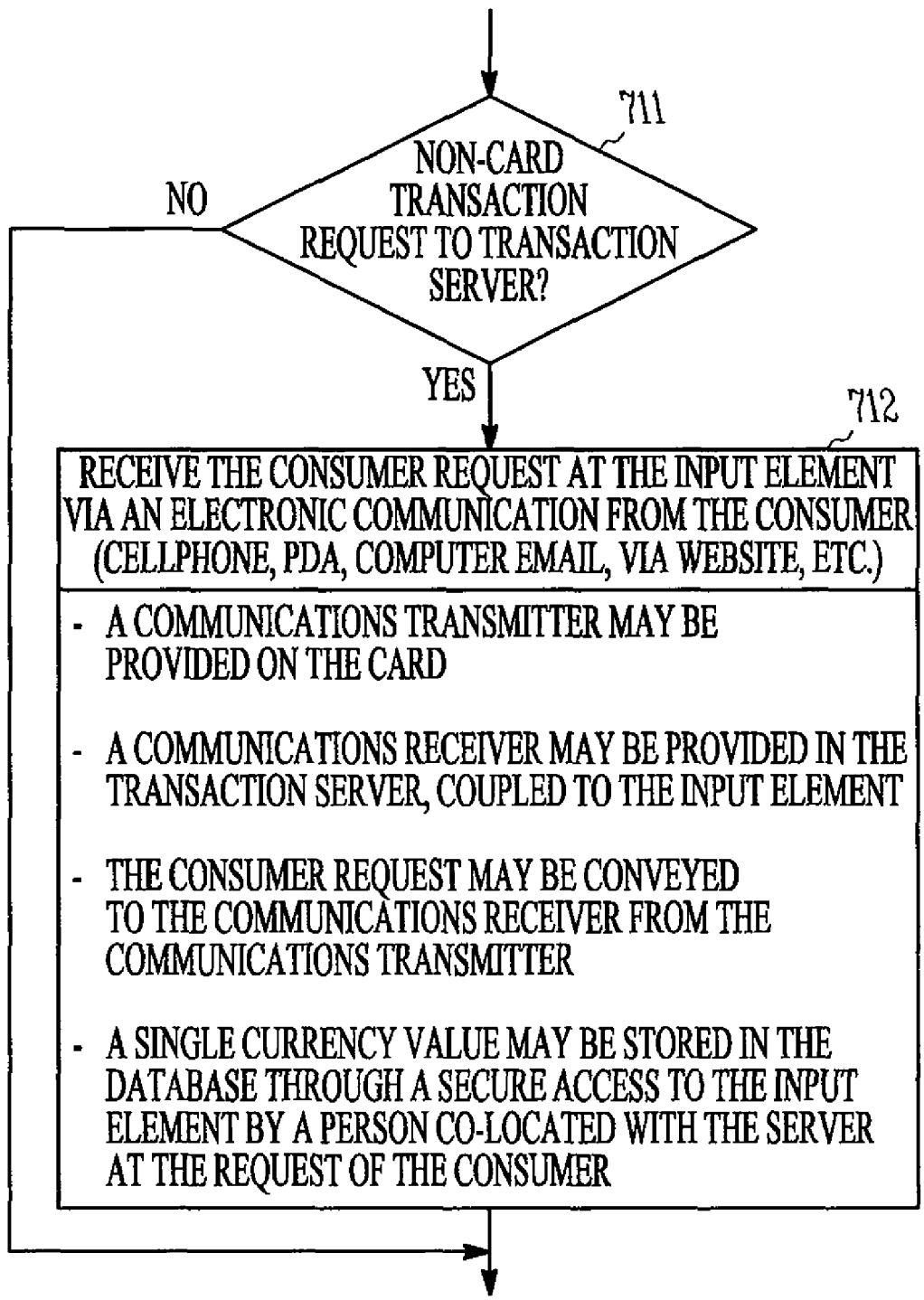
Figure 7E:
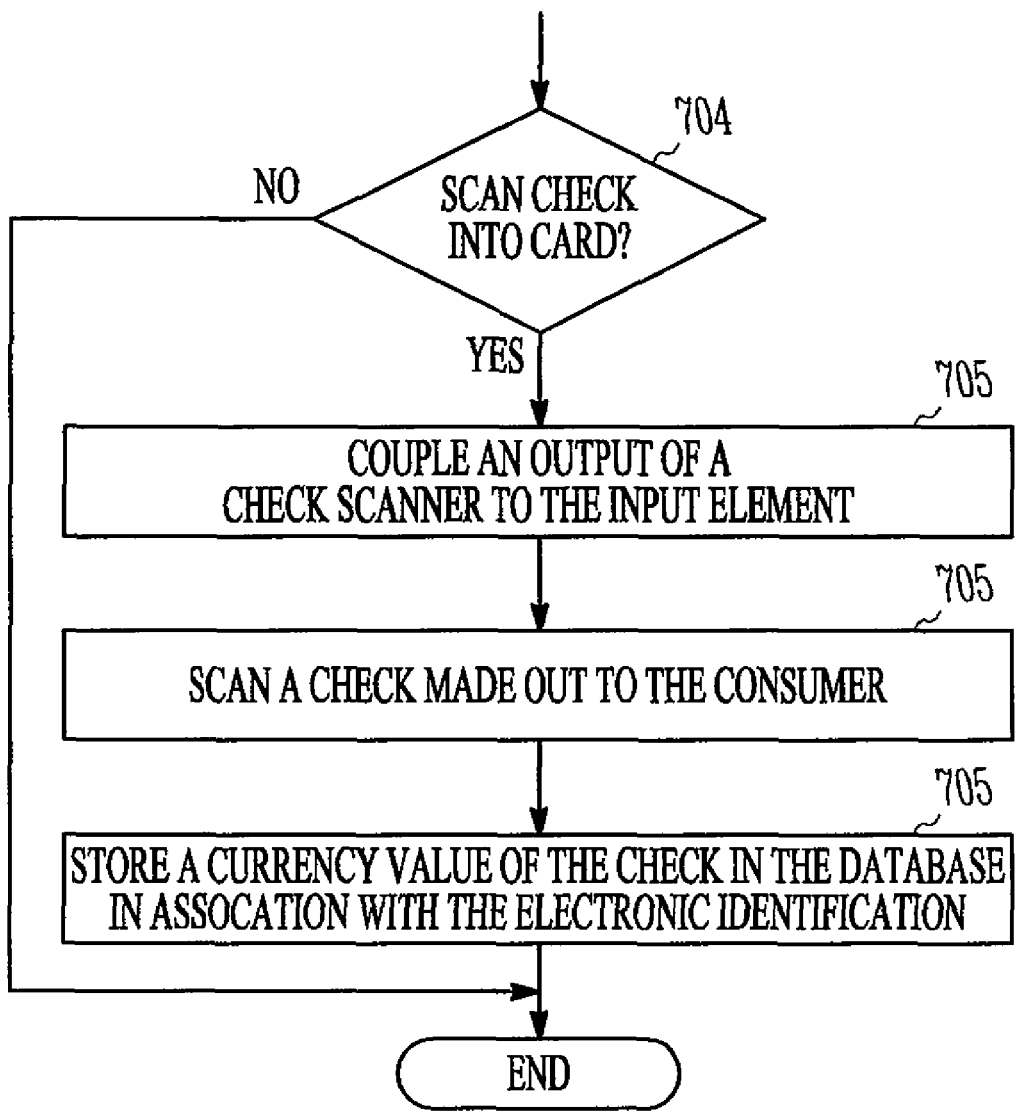

FIGS. 6A and 6B together constitute a flow diagram 600 illustrating several methods according to various embodiments. Some embodiments may provide a time-limited card-readable single purchase transaction to a member of an organization, optionally requiring authentication of the member before allowing the transaction.

In 601, a card is provided to the member. The card may optionally bear indicia suitably identifying the organization. The card may contain an electronic ID associated with the member. The ID may be contained within electronic storage (514, FIG. 5) or on a magnetic stripe (466, FIG. 5). The card may comprise an electronic storage to store a single currency value for a single purchase by the member. For example, a currency value in the amount of $500 may be stored for a member who has been authorized by an organization to obtain and pay for a particular automotive repair.

An electronic circuit (506, FIG. 5) may be provided on the card to inhibit any transaction by the member that is attempted after executing the single approved transaction. The electronic circuit may comprise, for example, a transaction counter and a logic circuit to inhibit more than a single transaction.

In 602, intelligence on the card, whether at a POS reader, at the transaction server, or elsewhere may prevent or inhibit any attempt of the member to spend more than the stored single currency value. At 603, it may also inhibit any attempt to load additional currency value into the electronic storage.

In 604, a time may be stored in the electronic storage after which the single currency value cannot be spent. Thus, a time limit may be imposed on the member's ability to purchase authorized goods and services. One reason for a time limit is to provide an incentive for the member to complete the purchase within a reasonable time period and not keep the card indefinitely. Another reason is to minimize opportunities for the member to lose or misplace the card.

In 605, if authentication of the intended purchaser is desirable or required, the method proceeds to 606; otherwise, it goes to 607.

In 606, the member may input a unique number or biometric into an optional security subsystem (e.g. security subsystem 510, FIG. 5 or alternatively a security subsystem located off the card). Authentication may be optional, depending upon the nature of the transaction and the amount stored in the card. In some embodiments, the unique input may correspond to a characteristic (e.g. product code) of the member's intended purchase, rather than a characteristic of the member.

In 607, if authentication is not required, a card-readable transaction is allowed without it.

FIGS. 7A-7E together constitute a flow diagram 700 illustrating several methods according to various embodiments. Some embodiments may provide a time-limited spending card to a consumer along with associated transaction-processing equipment such as a transaction server.

In 701, an electronic ID associated with the consumer is provided on the card. As mentioned earlier, in an embodiment a card may comprise only an electronic ID associated with the consumer. The electronic ID may be stored in a magnetic stripe, RFID, optical character recognition (OCR) indicia, or any other suitable manner. In other embodiments, a card may comprise additional elements, such as those illustrated, for example, in FIG. 5.

In 702, a transaction server is provided (e.g. transaction server 402, FIG. 4). The transaction server may comprise a rules engine, and a database containing the electronic ID and a single currency value associated with the electronic ID. The transaction server may also comprise a state element (e.g. state element 414, FIG. 4) having a first state and a second state. The state element could alternatively be implemented in software within a processor or rules engine. The transaction server also may comprise an input element or input port, which may either be integral with the server or external to the server. The state logic may function in such a manner that the card is inactive when the state element has the first state and active when the state element has the second state.

In 703, a timer may optionally be provided, e.g. on the card or on the transaction server. The timer may be set for a selected time. The time period may be suitable for the nature of the transaction and range from several hours to several days and even several weeks.

In 704, if the consumer is ready to activate the card, the method proceeds to 705; otherwise, it goes to 706.

In 705, the consumer may request that the card be activated, e.g. by communicating with a person at the organization, e.g. by any suitable manner such as a phone call or text message. The organization person may cause the state element to be switched from the first state to the second state. This could be achieved in an embodiment by entering a value into a keyboard by the organization person.

In 706, if the consumer desires to use the card, the method proceeds to 707; otherwise, it goes to 708.

In 707, the consumer or sales person may couple the card to the transaction server, e.g. via a card interface such as a magnetic stripe (466, FIG. 5) and a POS reader (440, FIG. 4). The transaction server, using a rules engine, for example, may allow a single card-readable transaction, when the transaction is received at the input element, only if the state element is in the second state. In an embodiment, when the transaction server receives the card ID number, it may search a database (e.g. database 406, FIG. 4) to find a record corresponding to that ID number, retrieve a number representing a single currency value authorized for the member having that ID number, and permit the purchase transaction to occur up to the amount of the single currency value stored in the database (assuming that the state element is in the second state).

In 708, if authentication of the intended purchaser is desirable or required, the method proceeds to 709; otherwise, it goes to 710.

In 709, a security subsystem may optionally be provided on the card (e.g. security subsystem 510, FIG. 5 or alternatively a security subsystem located off the card). Responsive to a unique input associated with the consumer or with the consumer's intended purchase, the card-readable transaction is allowed. The unique input may comprise a number or biometric. Authentication may be optional, depending upon the nature of the transaction and the amount stored in the card. In some embodiments, the unique input may correspond to a characteristic (e.g. product code) of the consumer's intended purchase, rather than a characteristic of the consumer.

In 710, if authentication is not required, a card-readable transaction may be allowed without it.

In 711, if the consumer desires to make a request to the transaction server, other than a card-related purchase transaction, the method proceeds to 712; otherwise it goes to 713.

In 712, the consumer makes a request to the transaction server or to an operator or other person associated with the server or the organization. As an example, the consumer's request may be received at the server's input element via an electronic communication, such as a phone call, a text message, email, or other communication from a PDA or computer. In an embodiment, the communication could be transmitted from an optional transmitter incorporated into the consumer's spending card. A communications receiver (e.g. cell site 420, FIG. 4) may be provided in association with the server and coupled to the server's input element. The consumer's request may be conveyed from the communications transmitter to the communications receiver. As a result of the consumer's communication, a single currency value corresponding to the consumer's electronic ID may be stored in the database. In an embodiment, this may result from a person co-located with the server (e.g. an operator or other person from the organization) making a secure access to the database through the input element, at the request of the consumer.

In 713, if the consumer desires to scan a check (written to the consumer as payee) into the card, the method proceeds to 714; otherwise it ends.

In 714, the output of a check scanner (e.g. check scanner 430, FIG. 4) may be communicatively coupled to the input element of the transaction server.

In 715, the check scanner may be scanned over a check written to the consumer as payee.

In 716, the currency value of the check may be stored in the database in association with the consumer's electronic ID.

Figure 8B:
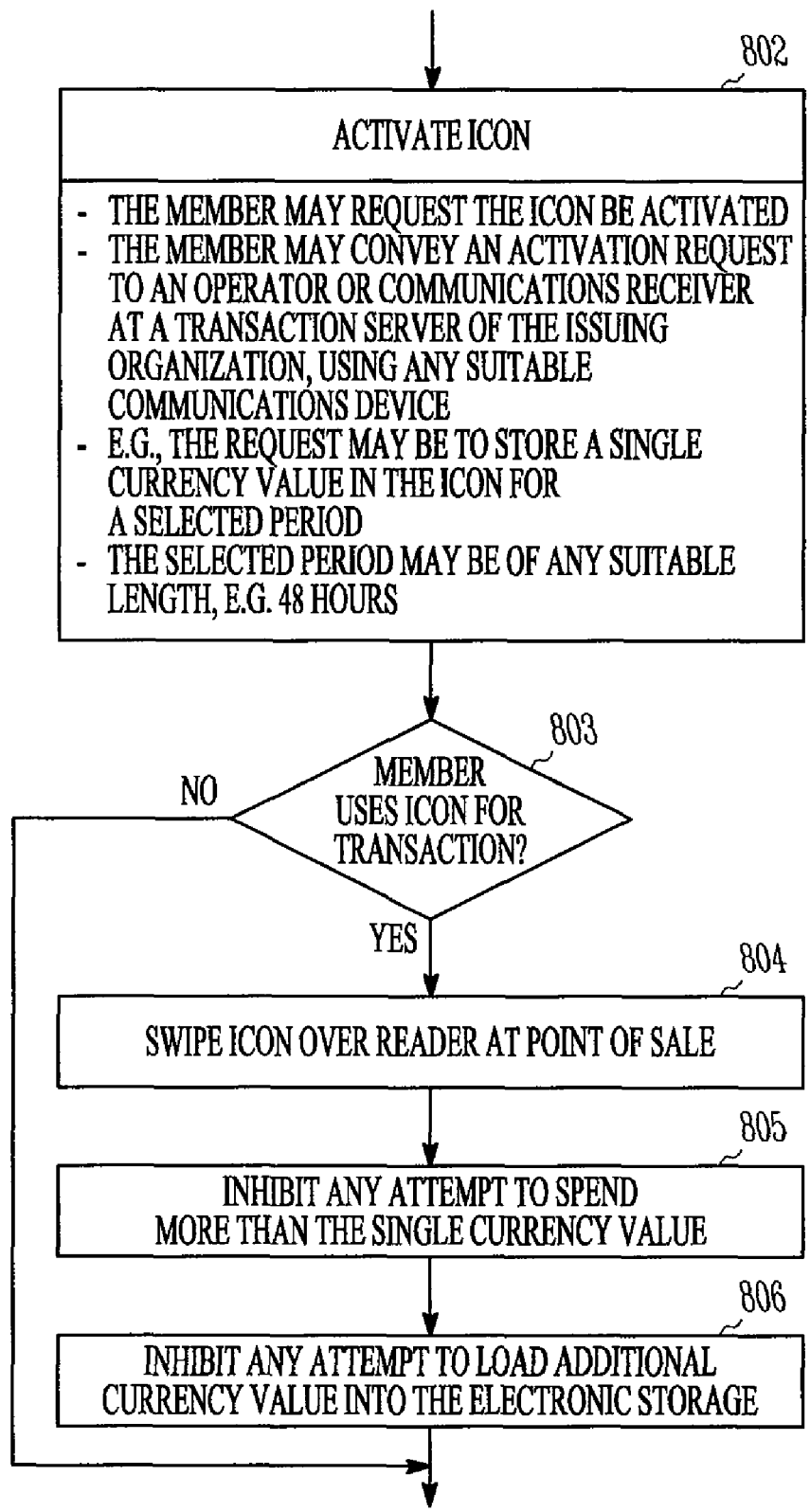
Figure 8C:
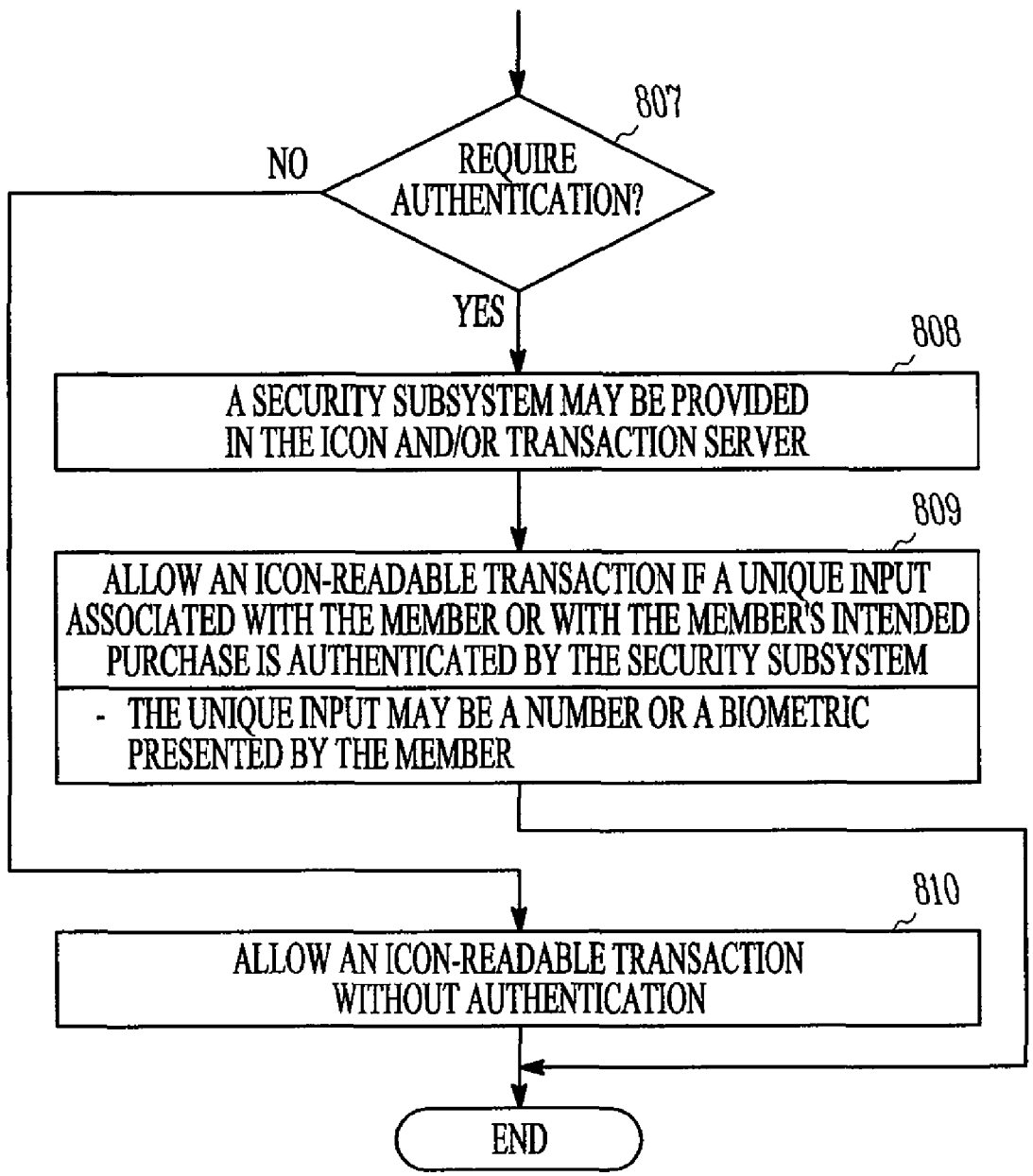
Figure 9B:
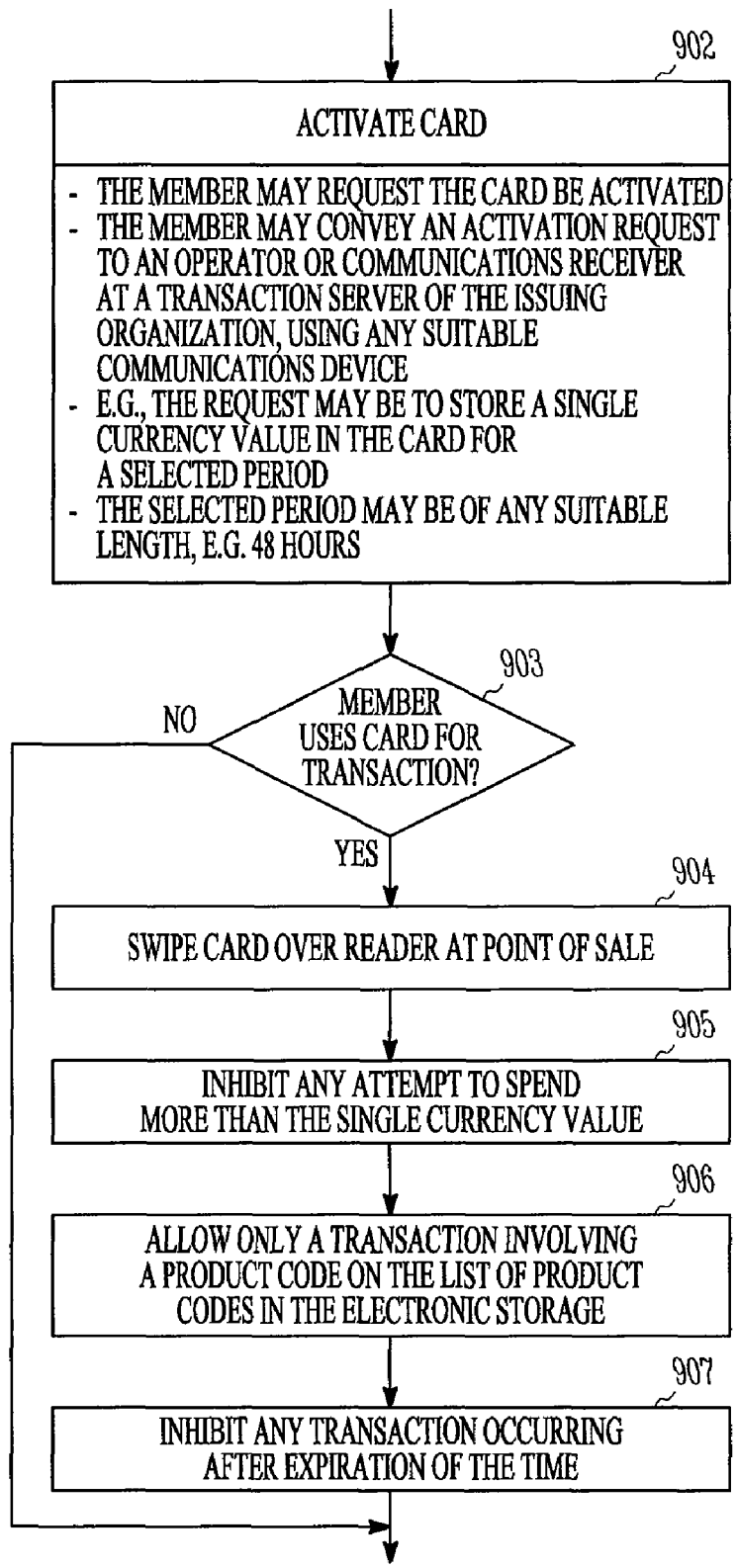
Figure 9C:
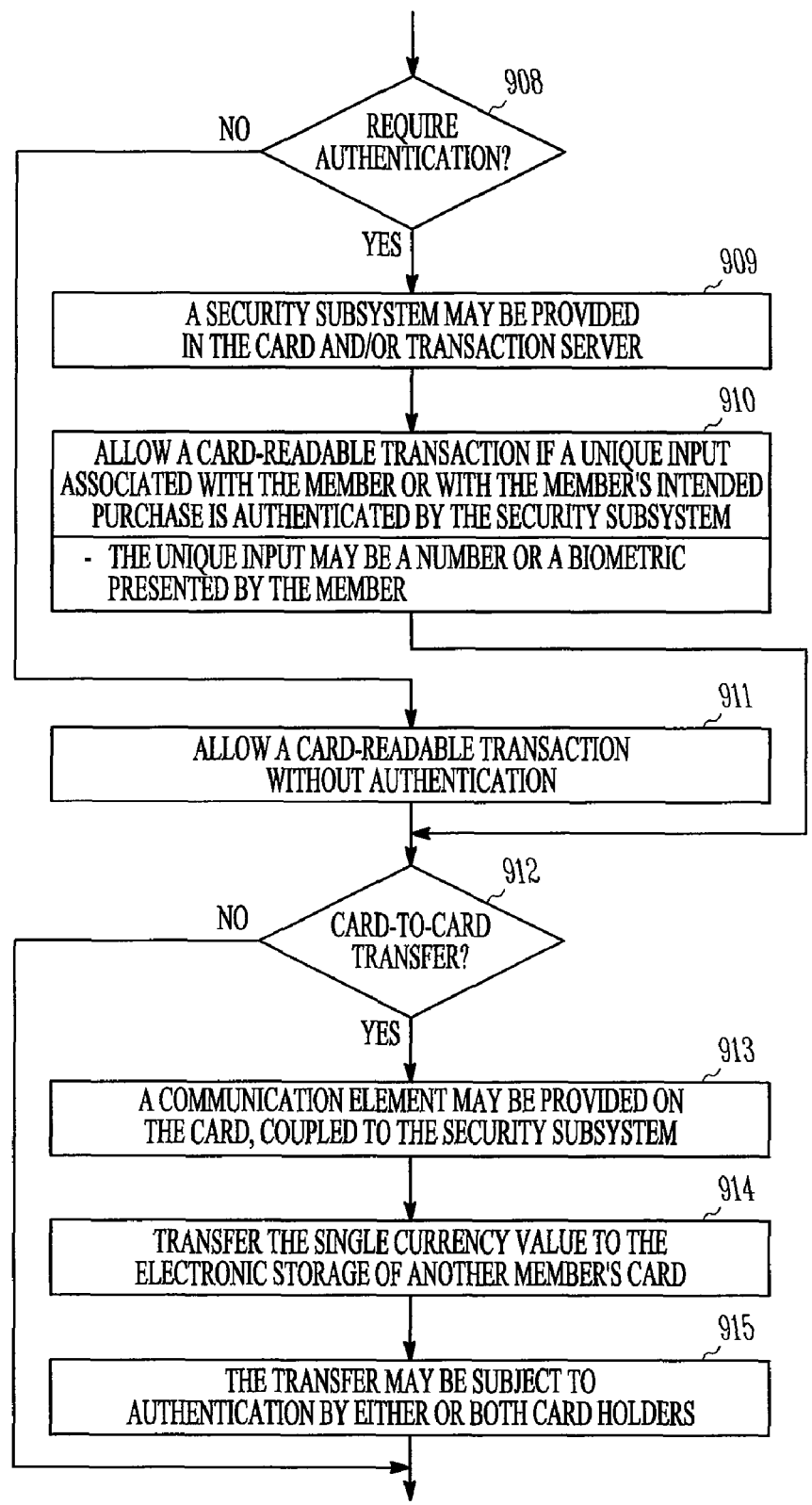
Figure 9D:
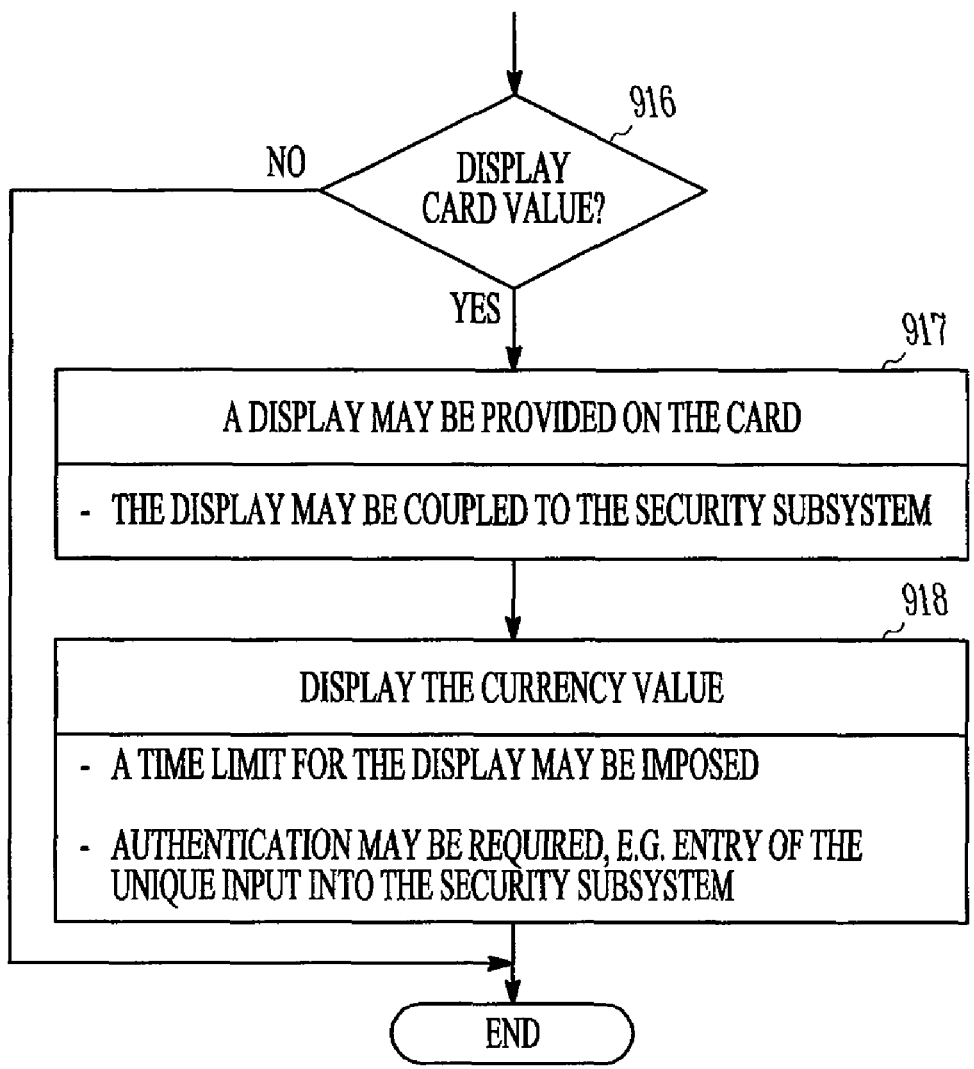
Figure 10A:
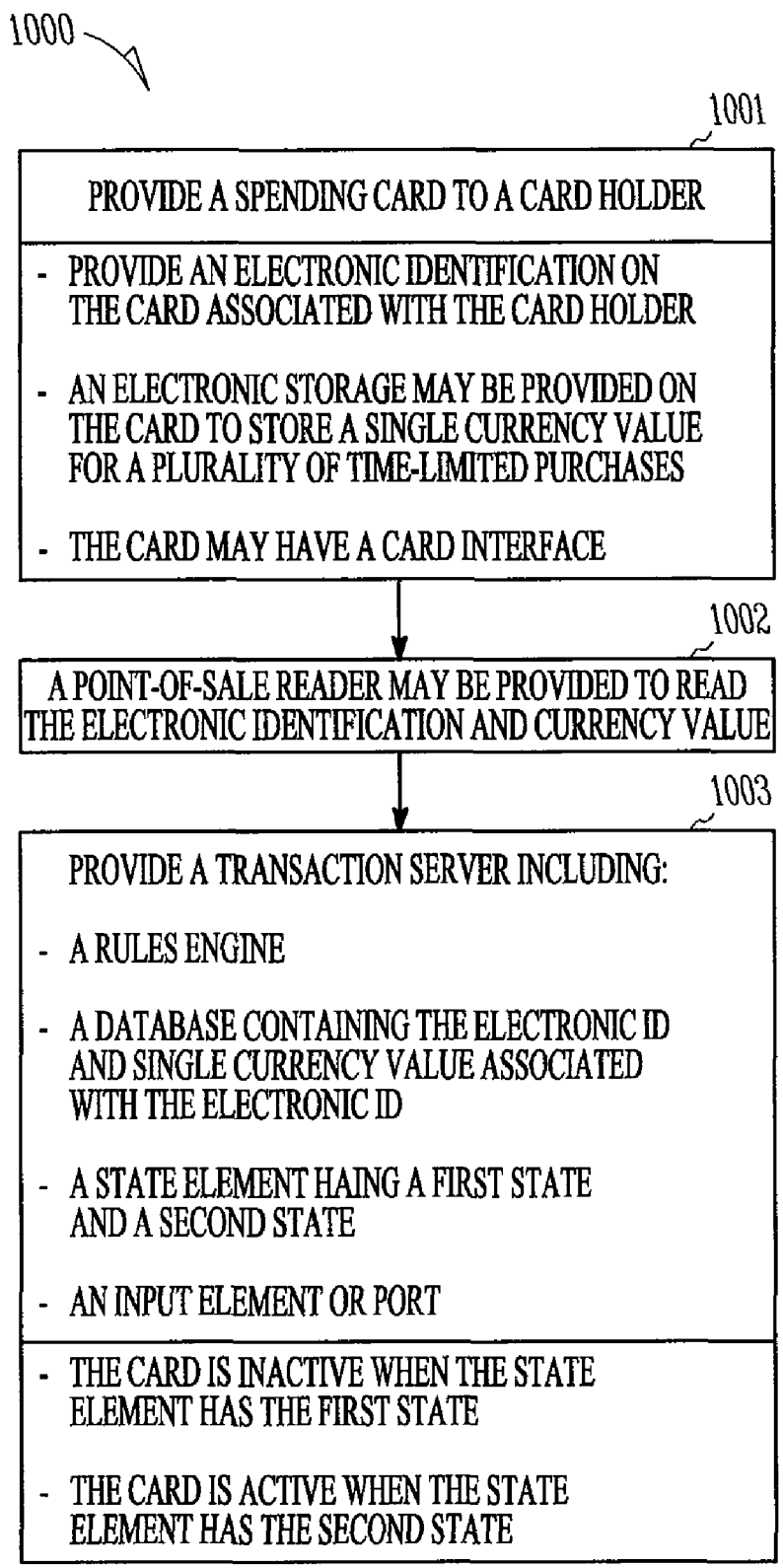
FIGS. 10A-10E together constitute a flow diagram illustrating several methods according to various embodiments.
Figure 10B:
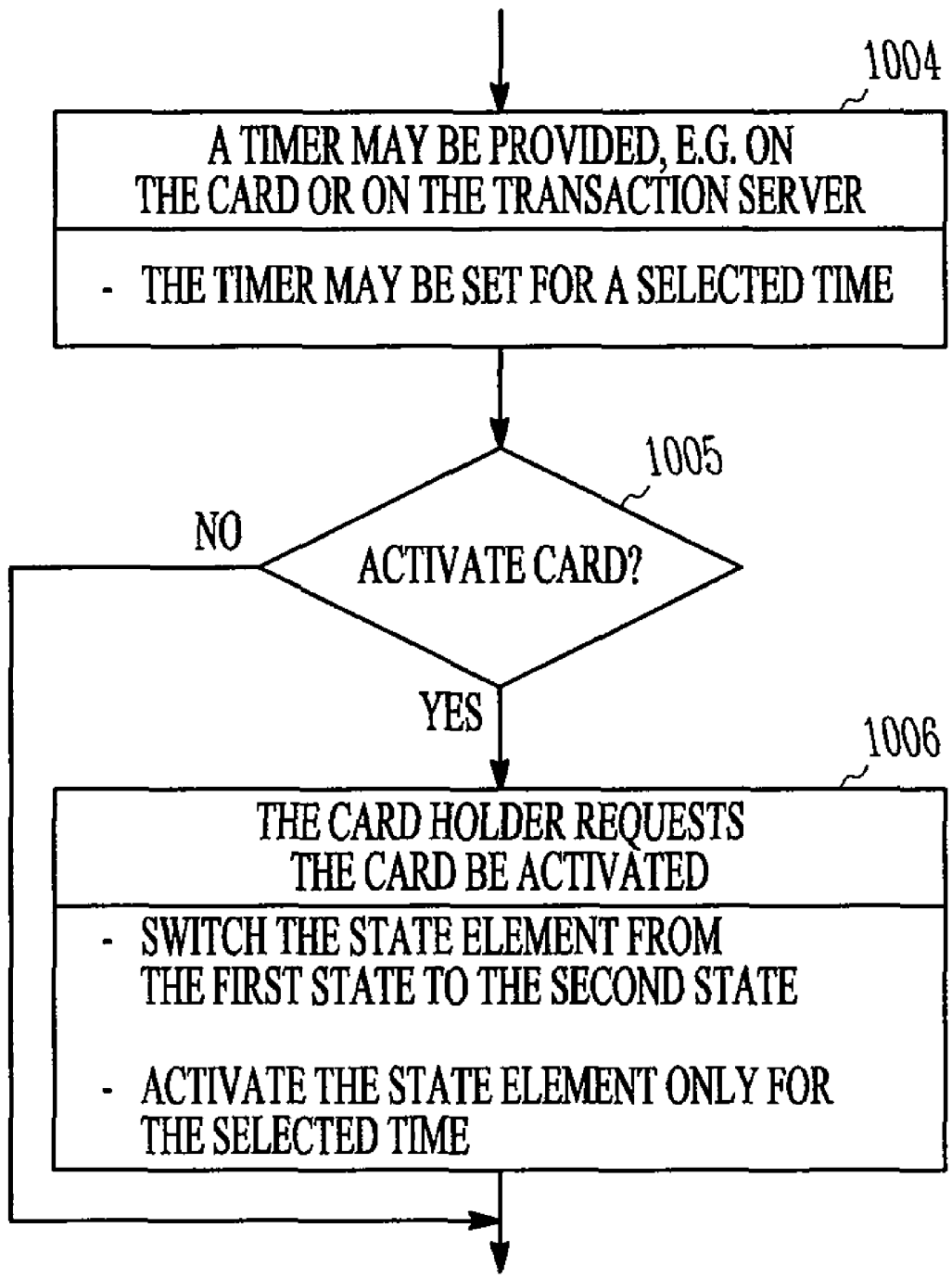
Figure 10C:
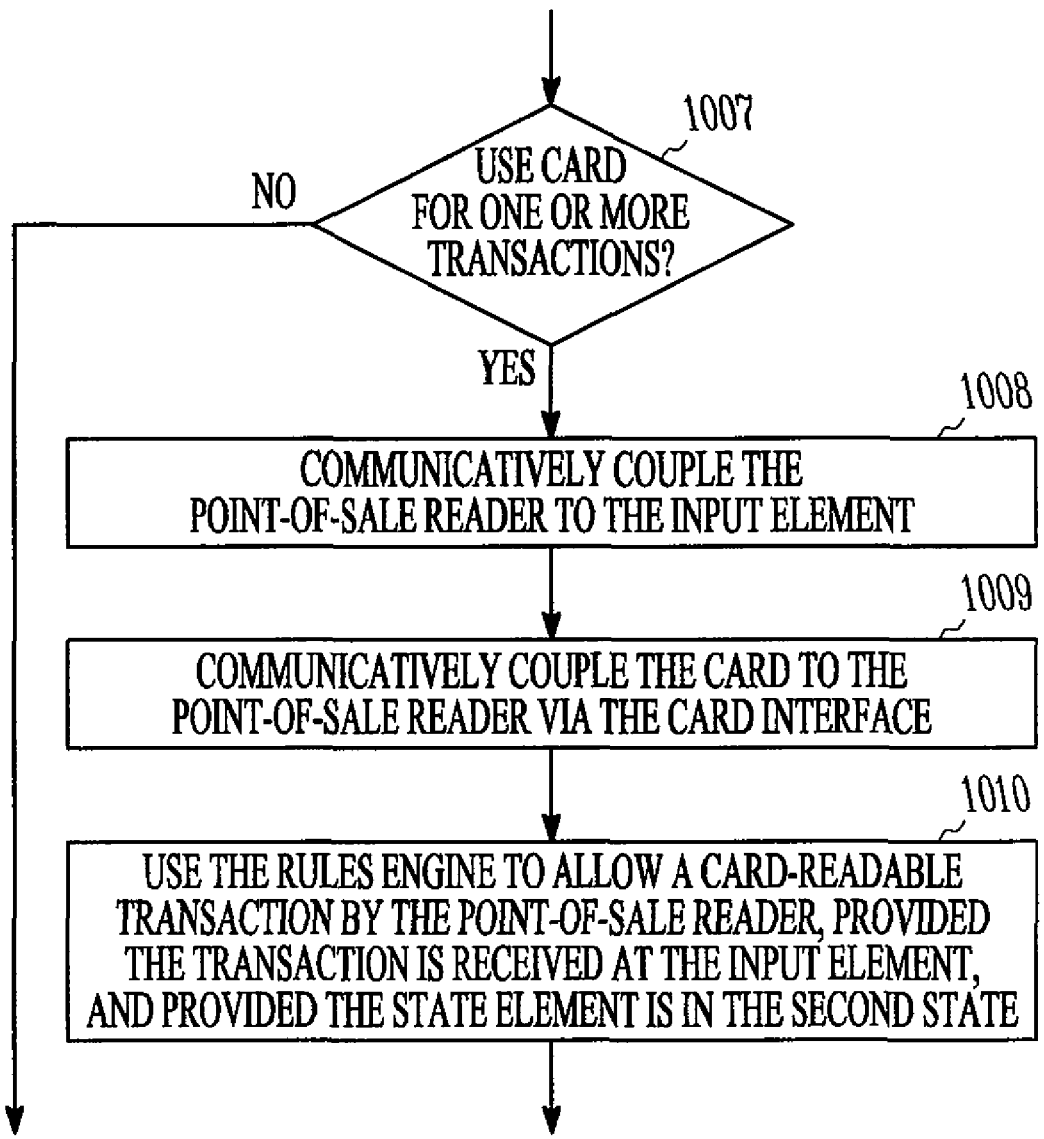
Figure 10D:
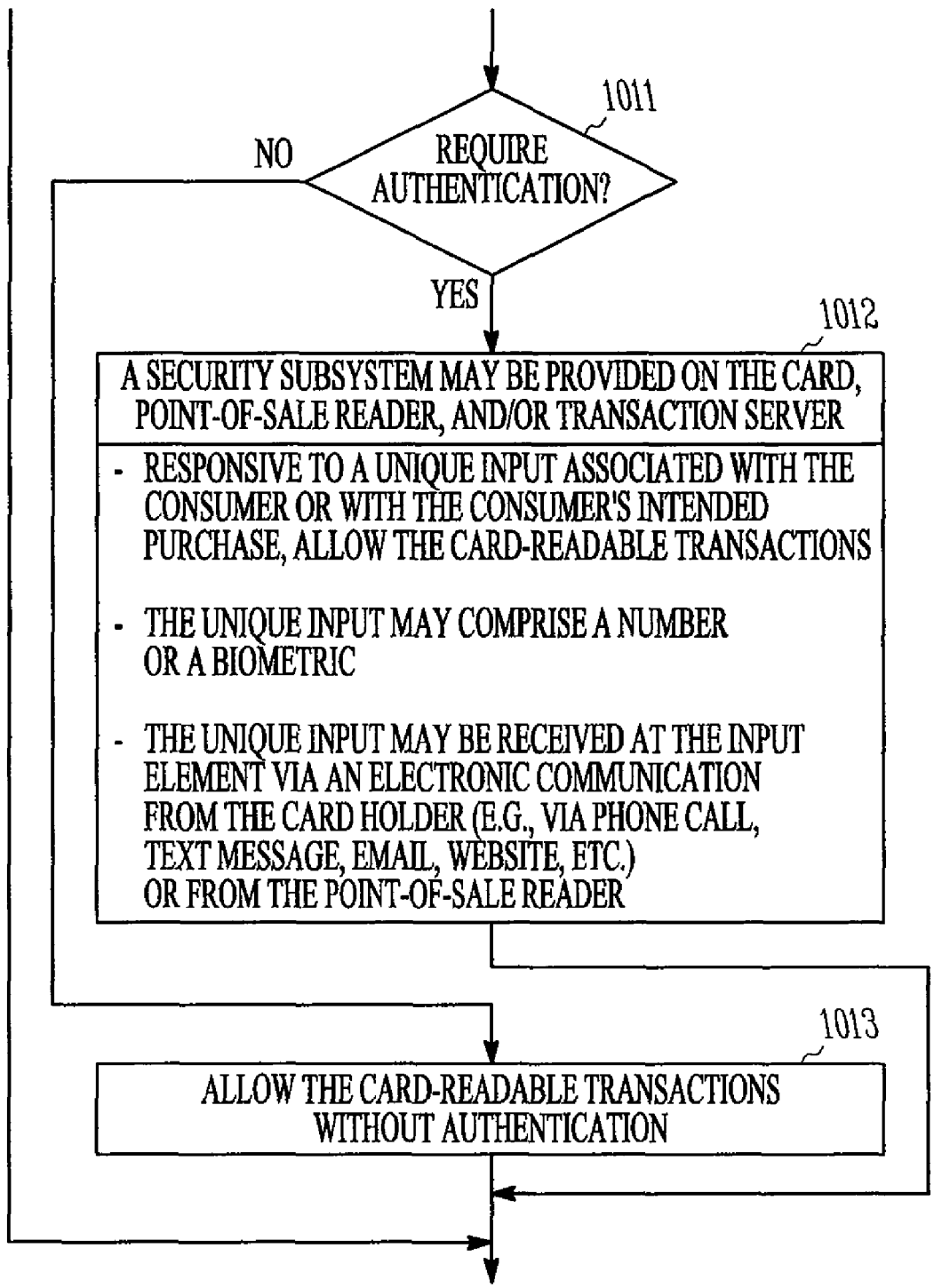
Figure 10E:
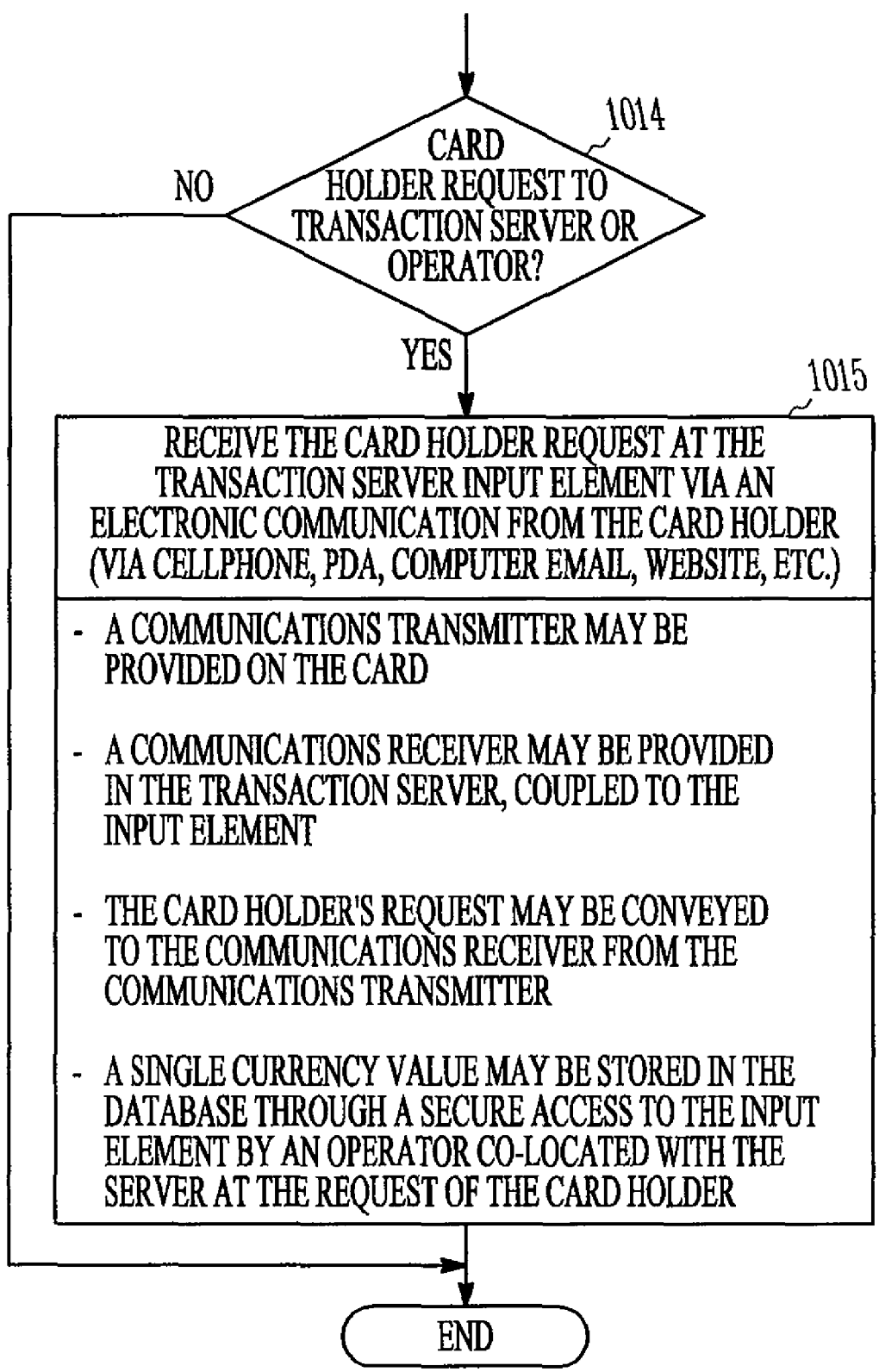

FIGS. 8A-8C together constitute a flow diagram 800 illustrating several methods according to various embodiments. Some embodiments may provide a spending icon to a member of an organization for a time-limited single purchase transaction, optionally requiring authentication of the member before allowing the transaction.

In 801, the icon may be provided with an electronic ID associated with the member. The icon may optionally comprise electronic storage to store a single currency value for a single purchase by the member. A time may optionally be stored in the electronic storage following which the currency value cannot be spent. In some embodiments, the purchase may be for any one of several items or services, the expenditure for which the member is insured by the organization.

Example expenses could be those associated with vehicular insurance, such as the purchase of a replacement vehicle, or vehicular towing, or vehicular repair, or medical expenses for injuries sustained in an accident. The purchases may be for property or casualty expenses that have been approved for the member by a representative of the organization. An electronic circuit may optionally be provided on the icon to inhibit any transaction that is attempted after a single transaction.

Indicia may optionally be provided on the icon to identify the issuing organization. The icon may have any desired form or shape. In an embodiment in which the organization is an automobile association, the icon may be shaped like a vehicle.

In an embodiment, the icon may be the member's own handheld device, such as a cell phone, PDA, pager, etc. The handheld device may comprise an embedded electronic device or circuit, such as an RFID tag, for example.

In 802, the member may convey an activation request to an operator or communications receiver at a transaction server of the issuing organization, using any suitable communication device. For example, the request may be to store a single currency value in the icon for a selected time period. The selected time period may be of any suitable length, such as 2 hours, 2 days, or 2 weeks.

In 803, if the member desires to use the icon for a transaction, the method proceeds to 804; otherwise, it goes to 807.

In 804, the icon is scanned, swiped, or placed over a POS reader at the point of sale. In an embodiment, a credit card processing business may process the transaction for the institution.

In 805, any attempt to spend more than the single currency value is prevented.

In 806, any attempt to load or store an additional currency value into the electronic storage of the icon may be inhibited.

In 807, if authentication of the intended purchaser is desirable or required, the method proceeds to 808; otherwise, it goes to 810.

In 808, the member may input a unique number or biometric into an optional security subsystem in the icon and/or transaction server (e.g. security subsystem 510, FIG. 5 or alternatively a security subsystem located off the icon). Authentication may be optional, depending upon the nature of the transaction and the amount stored in the icon.

Thus, in 809, an icon-readable transaction may be allowed if a unique input associated with the member or with the member's intended purchase is authenticated by the security subsystem. In some embodiments, the unique input may correspond to a characteristic (e.g. product code) of the member's intended purchase, rather than a characteristic of the member.

In 810, if authentication is not required, an icon-readable transaction may be allowed without it.

FIGS. 9A-9D together constitute a flow diagram 900 illustrating several methods according to various embodiments. Some embodiments may provide a time-limited card to a member of an insurance organization, optionally requiring authentication of the member before allowing the transaction.

In 901, the card may be provided with an electronic ID associated with the member. The card may optionally comprise electronic storage to store a single currency value for a single purchase by the member. A time may optionally be stored in the electronic storage after which the currency value cannot be spent. In some embodiments, the single purchase may be within an authorized category of purchases, subject to any applicable deductible amount. In some embodiments, the purchase of specific goods and/or services has not necessarily been authorized yet by the organization, but the member has been authorized to purchase an item from an authorized category. A list of product codes, corresponding to the authorized category of purchases, may optionally be stored in the electronic storage.

An electronic or logic circuit may optionally be provided on the card to inhibit any transaction that is attempted after a single transaction. The logic circuit may also inhibit any transaction other than for the authorized category of purchases. The logic circuit may also inhibit any attempt to spend more than the single currency value.

In 902, the member may convey an activation request to an operator or communications receiver at a transaction server of the issuing organization, using any suitable communication device. For example, the request may be to store a single currency value in the card for a selected time period. The selected time period may be of any suitable length, such as 2 hours, 2 days, or 2 weeks.

In 903, if the member desires to use the card for a transaction, the method proceeds to 904; otherwise, it goes to 908.

In 904, the card is scanned, swiped, or placed over a POS reader at the point of sale.

In 905, any attempt to spend more than the single currency value may be prevented.

In 906, only a single transaction involving a product code on the list of product codes in the electronic storage may be allowed.

In 907, any transaction occurring after the expiration of the selected time period may be inhibited.

In 908, if authentication of the intended purchaser is desirable or required, the method proceeds to 909; otherwise, it goes to 911.

In 909, the member may input a unique number or biometric into an optional security subsystem provided in the card and/or transaction server (e.g. security subsystem 510, FIG. 5 or alternatively a security subsystem located off the card). Authentication may be optional, depending upon the nature of the transaction and the amount stored in the card.

Thus, in 910, a card-readable transaction is allowed if a unique input associated with the member or with the member's intended purchase is authenticated by the security subsystem. In some embodiments, the unique input may correspond to a characteristic (e.g. product code) of the member's intended purchase, rather than a characteristic of the member.

In 911, if authentication is not required, a card-readable transaction is allowed without it.

In 912, if the member desires to make a card-to-card transfer, the method proceeds to 913; otherwise, it goes to 916.

In 913, a communication element may be provided on the card (e.g. RF transceiver 512 or RFID 518, FIG. 5), and it may be coupled to a security subsystem (e.g. security subsystem 510, FIG. 5).

In 914, the single currency value stored in the member's card may be transferred to the electronic storage of another member's card using, for example, the communication elements of each card.

In 915, the transfer may be subject to authentication by either or both card holders.

In 916, if the member desires to display the value currently stored in the card, the method proceeds to 917; otherwise, it ends.

In 917, a display is optionally provided on the card (e.g. display 516, FIG. 5). The display may comprise any suitable display, such as a liquid crystal display, light-emitting polymer, or the like.

In 918, the currency value may be displayed. A time limit for the display may be imposed for security purposes. Further, authentication may be required for the display.

FIGS. 10A-10E together constitute a flow diagram 1000 illustrating several methods according to various embodiments. Some embodiments may provide a time-limited spending card to a card-holding member of an organization to store a single currency value for making a plurality of purchases, optionally requiring authentication of the member before allowing each transaction, and additionally providing associated transaction-processing equipment such as a transaction server. The embodiments shown in FIGS. 10A-10D enable a member to make a series of time-limited purchases, such as might be required, for example, to pay for goods and services associated with an automobile accident or breakdown on an extended road trip. Such expenditures might be for towing, repairs, temporary shelter, food, covered medical expenses, a replacement vehicle, and the like.

In 1001, an electronic ID associated with the card holder is provided on the spending card. Electronic storage is optionally provided to store a single currency value to be applied to a plurality of time-limited, authorized purchases. The card may have a card interface.

In 1002, a POS reader may be provided to read the electronic ID and currency value.

In 1003, a transaction server is provided (e.g. transaction server 402, FIG. 4). The transaction server may comprise a rules engine, and a database containing the electronic ID and a single currency value associated with the electronic ID. The transaction server may also comprise a state element (e.g. state element 414, FIG. 4) having a first state and a second state. The state element could alternatively be implemented in software within a processor or rules engine. The transaction server also comprises an input element or input port, which may be integral to the server or external to the server. The state logic may function in such a manner that the card is inactive when the state element has the first state and active when the state element has the second state.

In 1004, a timer may optionally be provided, e.g. on the card or on the transaction server. The timer may be set for a selected time, for example several hours, days, or weeks.

In 1005, if the card holder is ready to activate the card, the method proceeds to 1006; otherwise, it goes to 1007.

In 1006, the card holder may request that the card be activated, e.g. by communicating with a person at the organization, e.g. by any suitable manner such as a phone call or text message. The card holder may request that a single currency value be associated with the card for a limited time, and that the card holder be authorized to make a plurality of purchases up to the single currency value within the limited time period. The person may cause the state element to be switched from the first state to the second state. This could be achieved in an embodiment by entering a value into a keyboard by the organization person.

In 1007, if the card holder desires to use the card for one of the plurality of authorized transactions, the method proceeds to 1008; otherwise, it goes to 1011.

In 1008, the POS reader may be communicatively coupled to the input element of the transaction server.

In 1009, the card holder or sales person may couple the card to a POS reader (440, FIG. 4), e.g. via a card interface such as a magnetic stripe (466, FIG. 5).

In 1010, the transaction server, using a rules engine, for example, may allow a plurality of card-readable transactions, when the transactions are received at the input element, only if the state element is in the second state.

In 1011, if authentication of the intended purchaser is desirable or required, the method proceeds to 1012; otherwise, it goes to 1013.

In 1012, a security subsystem may optionally be provided on the card (e.g. security subsystem 510, FIG. 5 or alternatively a security subsystem located off the card). Responsive to a unique input associated with the card holder or with the card holder's intended purchases, the card-readable transactions are allowed. The unique input may comprise a number or biometric. Authentication may be optional, depending upon the nature of the transaction and the amount stored in the card. In some embodiments, the unique input may correspond to a characteristic (e.g. product code) of the card holder's intended purchase, rather than a characteristic of the consumer.

In some embodiments, the unique input may be communicated to and received by the input element of the transaction server via an electronic communication from the card holder, e.g. via a phone call, text message, email, website, etc., or from the POS reader.

In 1013, if authentication is not required, the card-readable transactions may be allowed without it.

In 1014, if the card holder desires to make a request to the transaction server, other than a card-related purchase transaction, the method proceeds to 1015; otherwise it ends.

In 1015, the card holder makes a request to the transaction server or to an operator or other person associated with the server or the organization. As an example, the card holder's request may be received at the server's input element via an electronic communication, such as a phone call, a text message, email, or other communication from a PDA or computer. In an embodiment, the communication could be transmitted from a transmitter incorporated into the card holder's card. A communications receiver (e.g. cell site 420, FIG. 4) may be provided in association with the server and coupled to the server's input element. The card holder's request may be conveyed from the communications transmitter to the communications receiver. As a result of the card holder's communication, a single currency value may be stored in the database. In an embodiment, this may result from a person co-located with the server (e.g. an operator or other person from the organization) making a secure access to the database through the input element, at the request of the card holder.

It should be noted that the various operations shown in the flow diagrams do not necessarily have to be performed in the order illustrated or in any particular order or with any particular equipment. A preferred order of activities and a preferred set of equipment are left to the implementer, taking into consideration the objectives, budget, and available resources of the implementing organization.

The methods described herein may be performed by one or more computational subsystems. In an embodiment, each operation or activity is performed by at least one unique subsystem. In some embodiments, several operations may be performed by one subsystem, and in other embodiments one operation may be performed by multiple subsystems.

Moreover, various activities described with respect to the methods identified herein can be executed in serial or parallel fashion. Some activities may be repeated indefinitely, and others may occur only once. Various embodiments may have more or fewer activities than those illustrated. It will also be understood that although certain flow diagrams show an "End", they may be performed continuously if desired.

Any of the components previously described can be implemented in a number of ways, including embodiments in software. Thus, the member payment system 400, transaction server 401, memory 404, database 406, rules engine 408, processor 410, logic 412, state element 414, I/O element 416, cellular base station 420, check scanner 430, POS reader 440, cell phone 450, member payment card 460, and member payment icon 470 may all be characterized as "modules" herein.

The modules may include hardware circuitry, single or multi-processor circuits, memory circuits, software program modules and objects, firmware, and combinations thereof, as desired by the architect of the payment card system, and as appropriate for particular implementations of various embodiments.

The apparatus and systems of various embodiments can be used in applications other than requesting, retrieving, and delivering the exemplary information described herein. Thus, various embodiments are not to be so limited. The illustrations of the member payment system 400, including the transaction server 401, cellular base station 420, check scanner 430, POS reader 440, cell phone 450, member payment card 460, member payment icon 470, and block diagram 500 of internal components are intended to provide a general understanding of the structure of various embodiments. They are not intended to serve as a complete description of all the elements and features of apparatus and systems that might make use of the structures described herein.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 9 further below.

The various systems, methods, and techniques described herein may be implemented with hardware or software or, where appropriate, with a combination of both. Thus, the methods and apparatus of the present inventive subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the inventive subject matter. In the case of program code execution on programmable computers, the computer will generally include a processor, a storage medium readable by the processor (including volatile and non-volatile memory and/or storage elements), at least one input device, and at least one output device. One or more programs are preferably implemented in a high-level procedural or object oriented programming language to communicate with a computer system. However, the program(s) can be implemented in assembly or machine language, if desired. In any case, the language may be a compiled or interpreted language, and combined with hardware implementations.

The methods and apparatus of the present inventive subject matter may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the inventive subject matter. When implemented on a general-purpose processor, the program code combines with the processor to provide a unique apparatus that operates to perform the functionality of the systems and methods described herein.

While the present inventive subject matter has been described in connection with the preferred embodiments of the various figures, it is to be understood that other similar embodiments may be used, or modifications and additions may be made to the described embodiment for performing the same function of the present inventive subject matter without deviating there from. Furthermore, it should be emphasized that a variety of computer platforms, including handheld device operating systems and other application-specific hardware/software interface systems, are herein contemplated, especially as the number of wireless networked devices continues to proliferate. Therefore, the present inventive subject matter should not be limited to any single embodiment, but rather it should be construed in breadth and scope in accordance with the appended claims.

The disclosed embodiments described herein may be adapted for use in other processor architectures, computer-based systems, or system virtualizations, and such embodiments are expressly anticipated by the disclosures made herein and, thus, the present inventive subject matter should not be limited to specific embodiments described herein but instead construed most broadly.

Figure 11:
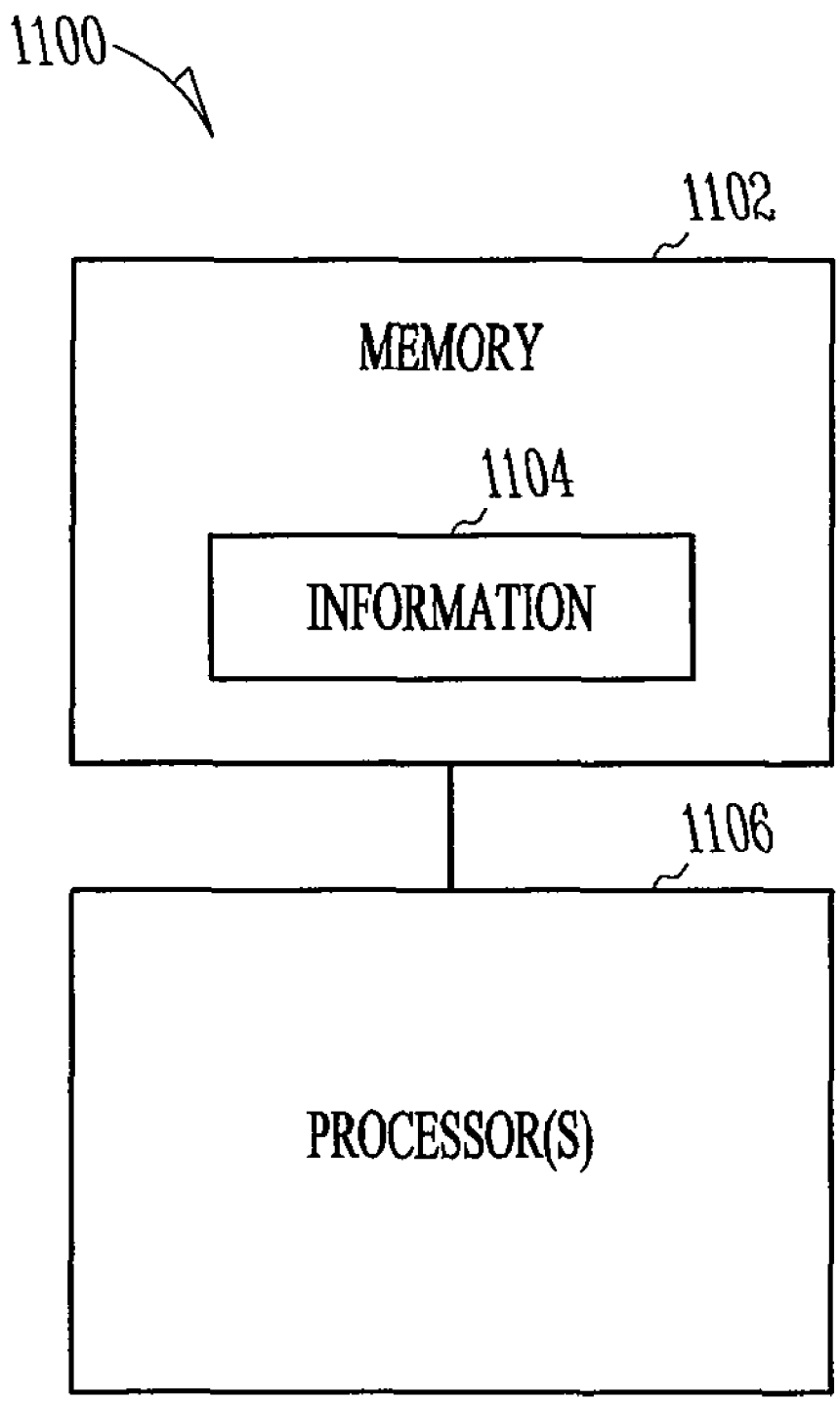
FIG. 11 is a block diagram of an article according to various embodiments.

FIG. 11 is a block diagram of an article 1100 according to various embodiments. Such embodiments may comprise a computer, a memory system, a magnetic or optical disk, some other storage device, or any type of electronic device or system. The article 1100 may include one or more processor(s) 1106 coupled to a machine-accessible medium such as a memory 1102 (e.g., a memory including electrical, optical, or electromagnetic elements). The medium may contain associated information 1104 (e.g., computer program instructions, data, or both), which, when accessed, results in a machine (e.g., the processor(s) 1106) performing the activities previously described herein.

Implementing the apparatus, systems, and methods, disclosed herein may enable a member of an organization to have a time-limited monetary value made available for a restricted purpose, in a cost-effective, timely manner. In some embodiments, the member is first authenticated to the system before the monetary value is made available. Improved efficiency, decreased delivery delays, transaction security, and increased customer satisfaction may result.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

"Suitable", as used herein, means having characteristics that are sufficient to produce the desired result(s). Suitability for the intended purpose can be determined by one of ordinary skill in the art using only routine experimentation.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the claims are hereby incorporated into the Detailed Description, with each claim standing on its own as a separate embodiment.

The invention claimed is:

1. A card for a member of an organization other than a bank or brokerage institution, the card for a single card-readable transaction by the member, the card comprising:
   an electronic identification associated with the member;
   a security subsystem responsive to a unique input directly on the card, made by the member, associated with a code identifying an intended purchase, to identify the member and to allow the card readable transaction;
   an electronic storage to store a single currency value for a single purchase transaction by the member; and
   an electronic circuit to inhibit a transaction after the single purchase transaction.

2. The card of claim 1, wherein the electronic circuit further inhibits an attempt to spend more than the single currency value.

3. The card of claim 1, wherein the electronic circuit further inhibits an attempt to store additional currency value into the electronic storage.

4. The card of claim 1, wherein the electronic storage is further to store a time after which the single currency value cannot be spent.

5. The card of claim 1, further comprising indicia identifying the organization.

6. The card of claim 1, further including a security subsystem, responsive to a unique input associated with at least one of the member or with the member's intended purchase, to allow the card-readable transaction.

7. The card of claim 6, wherein the unique input comprises at least one of a number or a biometric.

8. A method using a non-transitory computer-readable medium encoded with computer-readable instructions, the computer-readable instructions comprising instructions stored thereon that are executed by a processor to allow the use of a card for a single card-readable transaction by a member of an organization other than a bank or brokerage institution, the method comprising:
   associating an electronic identification provided on the card with the member;
   identifying the member through a security subsystem in the card responsive to a unique input, made by the member directly on the card, associated with a code identifying an intended purchase, to allow the card readable transaction;
   storing a single currency value on an electronic storage of the card for a single purchase transaction by the member; and inhibiting a transaction attempted after the single purchase transaction through an electronic circuit on the card.

9. The method of claim 8, further comprising:
   inhibiting an attempt to spend more than the single currency value.

10. The method of claim 8, further comprising:
    inhibiting an attempt to store additional currency value into the electronic storage.

11. The method of claim 8, further comprising:
    storing a time in the electronic storage after which the single currency value cannot be spent.

12. The method of claim 8, further comprising:
    providing indicia on the card to identify the organization.

13. The method of claim 8, further comprising:
    allowing the card-readable transaction if a unique input associated with at least one of the member or with the member's intended purchase is authenticated by a security subsystem coupled to the electronic circuit.

14. The method of claim 13, further comprising:
    receiving the unique input as at least one of a number or a biometric.

15. A computer-readable medium comprising computer-readable instructions to allow the use of a card for a single card-readable transaction by a member of an organization other than a bank or brokerage institution, said
   computer-readable instructions comprising instructions for:
      associating an electronic identification provided on the card with the member;
      identifying the member through a security subsystem in the card responsive to a unique input directly on the card, made by the member, associated with a code identifying an-identity of an intended purchase, to allow the card readable transaction;
      storing a single currency value on an electronic storage of the card for a single purchase transaction by the member; and
      inhibiting a transaction attempted after the single purchase transaction through an electronic circuit on the card.

16. The computer-readable instructions of claim 15, further comprising instructions for:
    inhibiting an attempt to spend more than the single currency value.

17. The computer-readable instructions of claim 15, further comprising instructions for:
    inhibiting an attempt to store additional currency value into the electronic storage.

18. The computer-readable instructions of claim 15, further comprising instructions for:
    storing a time in the electronic storage after which the single currency value cannot be spent.

19. The computer-readable instructions of claim 15, further comprising instructions for:
    providing indicia on the card to identify the organization.

20. The computer-readable instructions of claim 15, further comprising instructions for:
    allowing the card-readable transaction if a unique input associated with at least one of the member or with the member's intended purchase is authenticated by a security subsystem coupled to the electronic circuit.

21. The computer-readable instructions of claim 20, further comprising instructions for:
    receiving the unique input as at least one of a number or a biometric.

* * * * *